United States Patent [19]
Steensgaard

[11] Patent Number: 6,014,518
[45] Date of Patent: Jan. 11, 2000

[54] TERMINATING POLYMORPHIC TYPE INFERENCE PROGRAM ANALYSIS

[75] Inventor: Bjarne Steensgaard, Seattle, Wash.

[73] Assignee: Microsoft Corporation, Redmond, Wash.

[21] Appl. No.: 08/882,746

[22] Filed: Jun. 26, 1997

[51] Int. Cl.[7] .................................................. G06F 9/45
[52] U.S. Cl. .......................... 395/708; 395/705; 395/709
[58] Field of Search .................................... 395/705, 706, 395/707, 708, 709

[56] References Cited

U.S. PATENT DOCUMENTS

| | | | |
|---|---|---|---|
| 5,361,351 | 11/1994 | Lenkov et al. | 395/700 |
| 5,488,727 | 1/1996 | Agrawal et al. | 395/700 |
| 5,748,966 | 5/1998 | Sato | 395/708 |
| 5,790,866 | 8/1998 | Robison | 395/709 |

OTHER PUBLICATIONS

Agesen, Ole, *Concrete Type Inference: Delivering Object-Oriented Applications*, Ph.D. Thesis, Stanford University, Abstract and Table of Contents, pp. i–ii, and vi–viii (Dec. 1995).

Aho, Alfred V., et al., *Compilers: Principles, Techniques, and Tools*, Addison–Wesley Publishing Company, Contents and Chapter 6, pp. vii–x and 343–388 (1986).

Aiken, Alexander, et al., "Better Static Memory Management: Improving Region–Based Analysis of Higher–Order Languages," *Sigplan '95 Conference on Programming Language Design and Implementation*, La Jolla, California, pp. 174–185 (Jun. 1995).

Andersen, Lars Ole, *Program Analysis and Specialization for the C Programming Language*, Ph.D. Thesis, DIKU, University of Copenhagen, Denmark (May 1994).

Austin, Todd M., et al., "Efficient Detection of All Pointer and Array Access Errors," *Sigplan '94 Conference on Programming Language Design and Implementation*, Orlando, Florida, pp. 290–301 (Jun. 1994).

Birkedal, Lars, et al., "From Region Inference to von Neumann Machines via Region Representation Inference," *Proceedings of the 23rd Sigplan–Sigact Symposium on Principles of Programming Languages*, St. Petersburg, Florida, pp. 171–183 (Jan. 1996).

Burke, Michael, et al., "Flow–Insensitive Interprocedural Alias Analysis in the Presence of Pointers," Research Report RC 19546, IBM T.J. Watson Research Center, Yorktown Heights, New York, pp. 1–21 (Sep. 1994).

Chase, David R., et al., "Analysis of Pointers and Structures," *Proceedings of the ACM Sigplan '90 Conference on Programming Language Design and Implementation*, White Plains, New York, pp. 296–310 (Jun. 20–22, 1990).

Choi, Jong–Deok, et al., "Efficient Flow–Sensitive Interprocedural Computation of Pointer–Induced Aliases and Side Effects," *Twentieth Annual ACM Sigplan–Sigact Symposium on Principles of Programming Languages*, Charleston, South Carolina, pp. 232–245 (Jan. 10–13, 1993).

(List continued on next page.)

*Primary Examiner*—Emanuel Todd Voeltz
*Assistant Examiner*—Kakali Chaki
*Attorney, Agent, or Firm*—Watts, Hoffmann, Fisher & Heinke, Co., L.P.A.

[57] ABSTRACT

A terminating polymorphic type inference program analysis helps to better optimize, understand, and/or browse computer programs. The analysis represents parameter values for each function call in the program with separate types and modifies the types to comply with typing constraints. The analysis also determines whether a potential non-terminating loop has been entered. If so, the analysis modifies the types such that the types comply with the typing constraints and such that the type inference analysis will terminate. In this manner, the analysis will generate a usable finite set of types for programs regardless of whether the principal typing for the program is infinite in size.

53 Claims, 9 Drawing Sheets

OTHER PUBLICATIONS

Choi, Jong–Deok, et al., "On the Efficient Engineering of Ambitious Program Analysis," *IEEE Transactions on Software Engineering*, vol. 20, No. 2, pp. 105–114 (Feb. 1994).

Cousot, Patrick, et al., "Abstract Interpretation: A Unified Lattice Model for Static Analysis of Programs by Construction or Approximation of Fixpoints," *Proceedings of the Fourth Annual ACM Symposium on Principles of Programming Languages*, pp. 238–252 (Jan. 1977).

Cytron, Ron, et al., "Efficiently Computing Static Single Assignment Form and the Control Dependence Graph," *ACM Transactions on Programming Languages and Systems*, vol. 13, No. 4, pp. 451–490 (Oct. 1991).

Damas, Luis, et al., "Principal Type–Schemes for Functional Programs," *Conference Record of the Ninth Annual ACM Symposium on Principles of Programming Languages*, Albuquerque, New Mexico, pp. 207–212 (Jan. 1982).

Deutsch, Alain, "A Storeless Model of Aliasing and its Abstractions using Finite Representation of Right–Regular Equivalence Relations," *Proceedings of the IEEE 1992 International Conference on Computer Languages*, Oakland, California, pp. 2–13 (Apr. 1992).

Deutsch, Alain, "Interprocedural May–Alias Analysis for Pointers: Beyond k–limiting," *Sigplan '94 Conference on Programming Language Design and Implementation*, Orlando, Florida, pp. 230–241 (Jun. 1994).

Emami, Maryam, et al., "Context–Sensitive Interprocedural Points–to Analysis in the Presence of Function Pointers," ACAPS Technical Memo 54, Advanced Compilers, Architectures and Parallel Systems Group, School of Computer Science, McGill University, Montreal, Canada, pp. 1–28 (Nov. 12, 1993).

Heintze, Nevin, *Set Based Program Analysis*, Ph.D. Thesis, Carnegie Mellon Univeristy, Abstract, Contents, and Chapter 1, pp. i–iv and 1–6 (1992).

Henglein, Fritz, "Efficient Type Inference for Higher–Order Binding–Time Analysis," *Functional Programming Languages and Computer Architecture*, 5th ACM Conference, Cambridge, Massachusetts, pp. 448–472 (Aug. 26–30, 1991).

Henglein, Fritz, "Type Inference with Polymorphic Recursion," *ACM Transactions on Programming Languages and Systems*, vol. 15, No. 2, pp. 253–289 (Apr. 1993).

Kahn, G. "Natural Semantics," *Lecture Notes in Computer Science*, vol. 457, *Stacs 87 4th Annual Symposium on Theoretical Aspects of Computer Science*, Passau, Federal Republic of Germany, pp. 22–39, (Feb. 19–21, 1987).

Landi, William, et al., "A Safe Approximate Algorithm for Interprocedural for Interprocedural Pointer Aliasing," *Proceedings of the Sigplan '92 Conference on Programming Language Design and Implementation*, pp. 235–248 (Jun. 1992).

Landi, William, et al., "Interprocedural Modification Side Effect Analysis With Pointer Aliasing," *Proceedings of the Sigplan '93 Conference on Programming Language Design and Implementation*, pp. 56–67 (Jun. 1993).

Mairson, Harry G., "Deciding ML Typability is Complete for Deterministic Exponential Time," *Proceedings of the Seventeenth Annual ACM Symposium on Principles of Programming Languages*, pp. 382–401 (Jan. 1990).

Mycroft, Alan, "Polymorphic Type Schemes and Recursive Definitions," *Lecture Notes in Computer Science*, vol. 167, *Proceedings of the International Symposium on Programming*, 6th Colloquium, Toulouse, pp. 217–228 (Apr. 17–19, 1984).

O'Callahan, Robert, et al., "Detecting Shared Representations Using Type Inference," Technical Report CMU–CS–95–202, School of Computer Science, Carnegie Mellon University, Pittsburgh, Pennsylvania, pp. 1–21 (Sep. 1995).

Ruf, Erik, "Context–Insensitive Alias Analysis Reconsidered," *Sigplan '95 Conference on Programming Language Design and Implementation*, La Jolla, California, pp. 13–22 (Jun. 1995).

Steensgaard, Bjarne, "Sparse Functional Stores for Imperative Programs," *ACM Sigplan Workship on Intermediate Representations (IR' 95)*, San Francisco, California, pp. 62–70 (Jan. 22, 1995).

Steensgaard, Bjarne, "Points–to Analysis in Almost Linear Time," Technical Report MSR–TR–95–08, Microsoft Research, Redmond, Washington, pp. 1–12 (Mar. 1995).

Steensgaard, Bjarne, "Points–to Analysis in Almost Linear Time," *Proceedings of the 23rd Sigplan/Sigact Symposium on Principles of Programming Languages*, St. Petersburg, Florida, pp. 32–41 (Jan. 21–24, 1996).

Steensgaard, Bjarne, "Points–to Analysis by Type Inference of Programs with Structures and Unions," *Lecture Notes on Computer Science*, vol. 1060, *Proceedings of the 1996 International Conference on Compiler Construction*, Linköbing, Sweden, pp. 136–150 (Apr. 24–26, 1996).

Talpin, Jean–Pierre, et al., *Syntactic Control of Type Polymorphism for Recursive Function Definitions*, Technical Report ECRC–94–29, European Computer–Industry Research Centre GmbH, pp. I–III, 1–15, and i–xiv (Jul. 1994, Revised Feb. 1995).

Talpin, Jean–Pierre, et al., "Syntactic Type Polymorphism for Recursive Function Definitions," *Workshop on Types for Program Analysis*, pp. 80–94 (May 26–27, 1995).

Tarjan, Robert E., *Data Structures and Network Algorithms*, Regional Conference Series in Applied Mathematics, vol. 44, Society for Industrial and Applied Mathematics (SIAM), Table of Contents, pp. v–vi (1983).

Tofte, Mads, et al., "Implementation of the Typed Call–by–Value $\lambda$–calculus using a Stack of Regions," *Proceedings of the 21st ACM Sigplan–Sigact Symposium on Principles of Programming Languages*, Portland, Oregon, pp. 188–201 (Jan. 17–21, 1994).

Weihl, William E., "Interprocedural Data Flow Analysis in the Presence of Pointers, Procedure Variables, and Label Variables," *Seventh Annual ACM Symposium on Principles of Programming Languages*, Las Vegas, Nevada, pp. 83–94 (Jan. 28–30, 1980).

Weise, Daniel, et al., "Value Dependence Graphs: Representation Without Taxation," *Proceedings of the 21st ACM Sigplan–Sigact Symposium on Principles of Programming Languages*, Portland, Oregon, pp. 297–310 (Jan. 17–21, 1994).

Weise, Daniel, et al., "Value Dependence Graphs: Representation Without Taxation," Technical Report MSR–TR–94–03, Microsoft Research, Redmond, Washington, 14 pages (Apr. 13, 1994).

Wilson, Robert P., et al., "Efficient Context–Sensitive Pointer Analysis for C Programs," *Sigplan '95 Conference on Programming Language Design and Implementation*, La Jolla, California, pp. 1–12 (Jun. 1995).

Zhang, Sean, et al., "Program Decomposition for Pointer–induced Aliasing Analysis," Technical Report LCS-R–TR–259, Laboratory of Computer Science Research, pp. 1–37 (Mar. 1996).

Leroy, "Unboxed Objects and Polymorphic Typing," ACM, pp. 177–188, 1992.

Pierce et al., "Typing and Subtyping for Mobile Processes," Proc. of the Eighth Ann. Symp. on LICS, pp. 376–385, 1993.

Piperno et al., "Type Inference and Extensionality," Proc. of the Symp. on LICS, pp. 196–205, 1994.

Aiken et al., "Static Type Inference in a Dynamically Typed Language", ACM, pp. 279–290, 1990.

Flannery et al., "Conjunctive Polymorphic Type Checking On a Language of Combinators", Proceedings, 1990 Southeastern, pp. 183–187, 1990.

Giannini et al., "Characterization of Typing in Polymorphic Type Discipline", IEEE, pp. 61–70, 1988.

Kfourg et al., "On the Computational Power of Universally Polymorphic Recursion", IEEE, pp. 72–81, 1988.

TERMINATING POLYMORPHIC TYPE INFERENCE PROGRAM ANALYSIS

FIELD OF THE INVENTION

The present invention relates generally to the field of computer program analysis. More particularly, the present invention relates to the field of computer program analysis by type inference.

BACKGROUND OF THE INVENTION

Various programming tools perform static program analyses, for example, to better optimize, understand, or browse computer programs.

Software compilers, as one example of a programming tool, compile source code in a source language into target code in a target language. The target code may be executed directly by a data processing system or linked by a suitable linker with other target code for execution by the data processing system.

To help improve the execution of target code by the data processing system, one typical compiler performs optimization techniques based on the expected run-time usage of memory locations for the compiled program as defined by a store model or storage shape graph. The compiler may generate the store model by performing a pointer analysis to determine the effects of program statements referencing memory locations with constants, variables, or functions, for example.

One method used by typical programming tools to perform static program analyses, such as a pointer analysis for example, is type inference. Type inference methods for pointer analyses define types to approximate the run-time usage of memory locations for a program.

Polymorphic type inference methods, unlike monomorphic type inference methods, distinguish among the values of parameters passed to and from a function at different call sites in a program and may therefore be used for pointer analyses to represent a relatively more accurate approximation of the run-time usage of memory locations for the program. Indeed, typical polymorphic type inference methods, such as Henglein's semi-algorithm as described, for example, in Henglein, F., "Type Inference with Polymorphic Recursion," *ACM Transactions on Programming Languages and Systems*, Vol. 15, No. 2, pp. 253–289 (April 1993), may be used to infer a best possible or principal typing of the program. Because the principal typing for some programs is infinite in size, however, typical polymorphic type inference methods have limited application because they will not terminate in inferring types for such programs.

SUMMARY OF THE INVENTION

A method performs with a data processing system a polymorphic type inference analysis for a program comprising at least one function call. The method may be implemented in software stored by a memory for execution by a data processing system. The method may perform a pointer analysis using the polymorphic type inference analysis and may perform the analysis for a program while compiling the program for execution by a data processing system.

For the method, parameter values for each function call in the program are represented with separate types. A parameter variable for a function in the program may be represented with a generic type and a value for the parameter variable at a call site of the function may be represented with a substitution type for the generic type. Globally accessible locations for the program may be represented with global types. Each type may be represented by a type variable and an associated type constructor.

The types are modified to comply with typing constraints. The method determines whether a potential non-terminating loop has been entered, and, if so, the types are modified such that the types comply with the typing constraints and such that the type inference analysis will terminate. The modification of types for one function of the program may be prioritized over the modification of types for another function of the program.

In modifying types, a substitution type for a generic type having a generic type component may be defined such that the substitution type has a substitution type component for the generic type component. A first substitution type for a first generic type representing a potential pointer to a first location represented by a second generic type may be defined to represent a potential pointer to a second location represented by a second substitution type for the second generic type, wherein the first and second substitution types represent values for a same call site of a function.

The method may determine whether a potential non-terminating loop has been entered by determining whether the propagation of a constraint from a generic type to a substitution type triggers another propagation of a constraint from a generic type to a substitution type.

The method may also determine whether a potential non-terminating loop has been entered by identifying a first generic type having a type component and determining whether the type component is a substitution type reachable along a substitution path from a second generic type within a same function. The first generic type may represent a potential pointer to a location represented by the type component. The method may also determine whether the substitution type reachable along the substitution path was created in propagating a constraint to the first generic type as a substitution type for a generic type having the constraint.

In modifying types to comply with the typing constraints and so the type inference analysis will terminate, the second generic type may be unified with the substitution type reachable along the substitution path from the second generic type or the substitution type reachable along the substitution path may be defined as a generic type for all substitution types for the second generic type.

A data processing system performing the pointer analysis comprises a translator for translating a program comprising at least one function call in a first language into code in a second language, a pointer analyzer for performing the pointer analysis for the program, a store model for storing the types representing locations for the program, and an optimizer for optimizing the code based on the store model.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A terminating polymorphic type inference program analysis helps to better optimize, understand, and/or browse computer programs. A terminating polymorphic type inference program analysis is described in this detailed description for purposes of performing a pointer analysis and may be used for other suitable program analyses using type inference.

Figure 1:
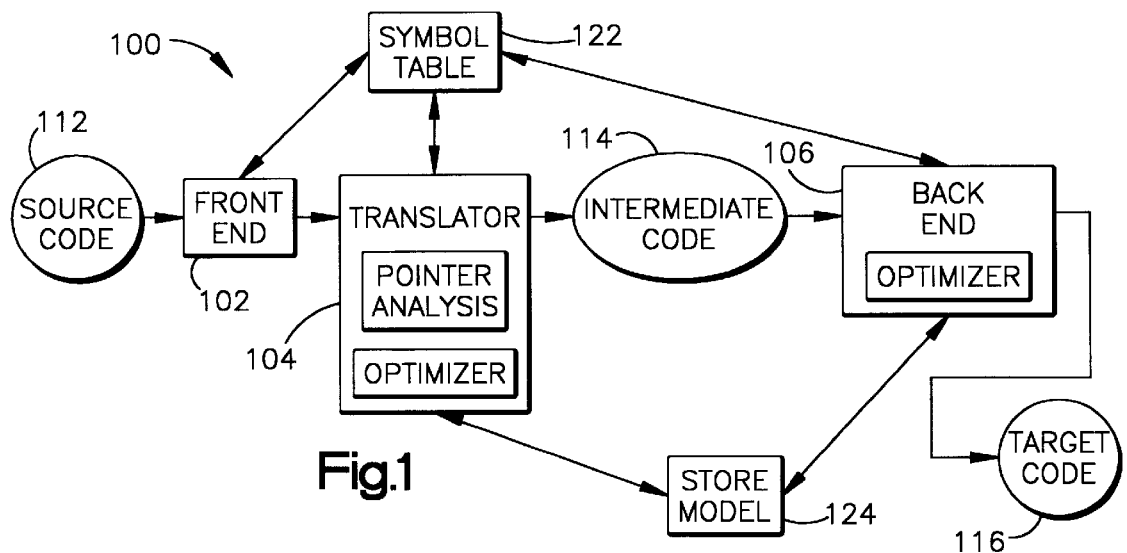
FIG. 1 illustrates for one embodiment a compiler that uses a terminating polymorphic type inference pointer analysis in compiling source code.

A terminating polymorphic type inference pointer analysis helps approximate run-time store usage for a computer program. This pointer analysis may supplement the pointer analysis described in U.S. patent application Ser. No. 08/664,441, filed Jun. 18, 1996, entitled POINTER ANALYSIS BY TYPE INFERENCE COMBINED WITH A NON-POINTER ANALYSIS, by Bjarne Steensgaard, or the pointer analysis described in U.S. patent application Ser. No. 08/719,144, filed Sep. 24, 1996, entitled POINTER ANALYSIS BY TYPE INFERENCE FOR PROGRAMS WITH STRUCTURED MEMORY OBJECTS AND POTENTIALLY INCONSISTENT MEMORY OBJECT ACCESSES, by Bjarne Steensgaard. U.S. patent application Ser. No. 08/664,441 and U.S. patent application Ser. No. 08/719,144 are incorporated by reference. The pointer analysis may be used for any suitable programming tool or analyzer, such as a suitable program understanding and browsing tool or a suitable program compiler or interpreter for example. FIG. 1 illustrates for one embodiment a program compiler 100 that uses this pointer analysis.

Compiler 100 is implemented in software for execution by a suitable data processing system and comprises a front end 102, a translator 104, and a back end 106. Compiler 100 compiles source code 112 in a suitable source language into target code 116 in a suitable target language. Target code 116 may be executed directly by a suitable data processing system or linked by a suitable linker with other target code for execution by the data processing system.

Front end 102 is source language dependent and performs suitable lexical, syntax, and semantic analyses, for example, on source code 112. Translator 104 generates suitable intermediate code 114 based on the lexical, syntax, and semantic information generated by front end 102. Back end 106 is machine dependent and generates target code 116 based on intermediate code 114. Compiler 100 generates intermediate code 114 to represent source code 112 independent of the source language for source code 112 and independent of the specific machine or data processing system to execute target code 116.

In analyzing source code 112, front end 102 generates a suitable symbol table 122 in the form of a data structure for recording identifiers, such as variables and function names for example, used in source code 112. Suitable attribute information regarding each recorded identifier is also recorded and referenced for front end 102, translator 104, and back end 106.

As illustrated in FIG. 1, translator 104 performs the pointer analysis. Translator 104 evaluates statements referencing memory locations with variables and/or functions, for example, of source code 112 using symbol table 122 to determine store usages for the memory locations. Translator 104 generates a store model 124 in the form of a data structure to represent an approximation of the run-time store usage for source code 112. For another embodiment, front end 102 may perform the pointer analysis to generate store model 124 while parsing source code 112. As illustrated in FIG. 1, translator 104 and/or back end 106 may use store model 124 to help optimize intermediate code 114 and target code 116, respectively, with suitable techniques including, for example, code motion, common subexpression elimination, dead code elimination, peephole optimization, and register allocation techniques.

Source Language

The pointer analysis may be performed for code in any suitable source language that supports, for example, pointers to locations, pointers to functions, dynamic data allocation, data address computation for variables, and/or pointer arithmetic. One suitable source language supports one or more of the following forms of abstract syntax statements S:

$$\begin{aligned}
S ::=\ & x = y \\
|\ & x = \&y \\
|\ & x = {}^*y \\
|\ & x = \text{allocate}(y) \\
|\ & *x = y \\
|\ & x = op(y_1 \ldots y_n) \\
|\ & x = \text{fun}(f_1 \ldots f_n) \to (r_1 \ldots r_m) S^* \\
|\ & l\colon x_1 \ldots x_m = p(y_1 \ldots y_n)
\end{aligned}$$

where x, y, f, r, p, and l range over a set of variable names, op ranges over a set of primitive operator names and constants, and S* denotes a sequence of statements.

The x=y statement form describes the assignment of the value of the variable y to the variable x.

The x=&y statement form describes the assignment of the address of the variable y to the variable x so the value of the variable x points to y.

The x=*y statement form describes the assignment of the content of the location pointed-to by the value of the variable y to the variable x.

The x=allocate(y) statement form describes the allocation of a block of memory of size y and the assignment of the address of the allocated block to the variable x so the value of x points to the location for the allocated block.

The *x=y statement form describes the assignment of the value of the variable y to the content of the location pointed-to by the value of the variable x.

The x=op($y_1 \ldots y_n$) statement form describes the performance of the primitive operation identified by op, such as addition, subtraction, etc., on the values of the operand variables $y_1 \ldots y_n$ and the assignment of the operation result to the variable x. This statement form may describe the computation of offsets into aggregate objects. This statement form may also describe the assignment of a constant to the variable x, such as for the statement x=7 for example.

The x=fun($f_1 \ldots f_n$)→($r_1 \ldots r_m$) S* statement form describes the definition of a function or procedure and the assignment of a pointer to the defined function to the variable x. The function is defined with formal parameter variables $f_1 \ldots f_n$, return parameter variables $r_1 \ldots r_m$, and a body represented by the sequence of statements S*. The sequence of statements S* is executed when the function is called.

The l: $x_1 \ldots x_m$=p ($y_1 \ldots y_n$) statement form describes the call of a function or procedure pointed-to by the value of the variable p with the values of the variables $y_1 \ldots y_n$ passed as parameters to the called function and with the values of the return parameter variables for the called function respectively assigned to the variables $x_1 \ldots x_m$ after execution of the called function. The label l uniquely identifies the statement and the function call.

For one embodiment, the pointer analysis is performed independent of program control flow, and therefore the source language may support any suitable control flow structures. The pointer analysis for one embodiment is performed independent of type casts and type declarations for the source language. The C programming language is one suitable source language for the pointer analysis.

Types

The pointer analysis uses types to define a store model or storage shape graph representing an approximation of the run-time store usage for a program. A type represents a set of one or more locations and describes the content of those locations. The types define points-to relationships among the sets of locations as determined by the pointer analysis in accordance with typing constraints, and the set of types for a program define the store model for the program. The types used for the pointer analysis are to be distinguished from the types, such as character, integer, long, float, double, etc., associated with type declarations in a program.

To define types for a program in a source language supporting location pointer variables, such as for pointers to locations, dynamic data allocation, and/or data address computation for example, the pointer analysis represents each location representing a variable of the program and each dynamically allocated location of the program with a location type. A location type represents a set of one or more locations and comprises a type representing a set of locations that may be pointed-to by the content of the location(s). For one embodiment, the pointer analysis describes each location pointer by the type representing the pointed-to location(s).

To define types for a program in a source language supporting function pointer variables, the pointer analysis represents each function of the program with a function type. A function type represents a set of one or more functions and comprises types representing the locations or values of the formal and return parameter variables for the represented function(s). The pointer analysis represents each location for a function pointer variable with a type comprising a function type representing the function(s) pointed-to by the content of the represented location. For one embodiment, the pointer analysis describes each function pointer by the type representing the pointed-to function(s).

As values for variables may comprise pointers to locations and pointers to functions for some source languages, the pointer analysis for one embodiment describes the value of a variable with both a location type to describe a location pointer and a function type to describe a function pointer. This typing may be described as follows:

$$\alpha ::= \tau \times \lambda$$
$$\tau ::= \bot \mid ref(\alpha)$$
$$\lambda ::= \bot \mid lam(\alpha_1 \ldots \alpha_n)(\alpha_{n+1} \ldots \alpha_{n+m})$$

That is, the type α describes the value or the content of the represented location(s) with a location type component τ and a function type component λ. Location type components τ represent locations and location pointers and are either ⊥ or comprise both a location type component τ and a function type component λ. The l designation for the location type component τ indicates the value(s) described by the location type component τ do(es) not comprise a location pointer. Function type components λ represent functions and function pointers and are either ⊥ or comprise types representing the values of the formal and return parameter variables for the represented functions. The ⊥ designation for the function type component λ indicates the value(s) described by the function type component λ do(es) not comprise a function pointer.

The pointer analysis may also describe with types composite objects, such as records or structures for example, and locations containing constants. The pointer analysis for one embodiment may represent the elements of a composite object with a single type. For another embodiment, the pointer analysis may represent the elements of a composite object in accordance with the type inference pointer analysis of U.S. patent application Ser. No. 08/719,144, filed Sep. 24, 1996, entitled POINTER ANALYSIS BY TYPE INFERENCE FOR PROGRAMS WITH STRUCTURED MEMORY OBJECTS AND POTENTIALLY INCONSISTENT MEMORY OBJECT ACCESSES, by Bjarne Steensgaard.

The pointer analysis for one embodiment represents each type with a type variable in the form of a data structure and an associated type constructor in the form of a data structure. Each type variable represents a set of one or more locations or a set of one or more functions. For one embodiment, each type variable is implemented as an equivalence class representative (ECR) data structure. The data structure may be Tarjan's fast-union/find data structure, for example.

The type constructor associated with a type variable representing a set of locations comprises other type variables describing the content of the represented location(s). Using the above types, a ref type constructor comprises a location type component τ and a function type component λ. The location type component τ and the function type component λ are each represented with a type variable and an associated type constructor.

The type constructor associated with a type variable representing a set of functions for one embodiment comprises other type variables representing the values of the formal and return parameter variables for the represented function(s). Using the above types, a lam type constructor comprises a location type component τ and a function type component λ for each formal and return parameter variable of the represented function(s). The location type component τ and the function type component λ are each represented with a type variable and an associated type constructor. For another embodiment, the type constructor associated with a type variable representing a set of functions comprises other type variables representing the locations of the formal and return parameter variables for the represented function(s).

A terminating polymorphic type inference program analysis for other embodiments may use type systems supporting suitable type constructors other than location and function type constructors. A suitable type constructor having component types may be considered a generalization of a location type.

Type Rules

The pointer analysis describes the locations and functions for a program with types so the set of types defining the store model for the program is a valid description of all possible run-time storage configurations for a program. For the program to be typed in this manner, or well-typed, the pointer analysis identifies store usages, including pointer relationships, for the locations and functions for the program and describes the locations and functions for the program with types in accordance with typing constraints based on the store usages.

For a well-typed program, the pointer analysis represents each location for the program with a single type and describes each location pointer for the program with a type representing the pointed-to location(s). If a location pointer may point to either one of two locations, the pointer analysis represents the two locations with the same type and describes the location pointer with the type representing both locations. If two location pointers may point to the same location, the pointer analysis describes each of the two location pointers with the type representing the pointed-to location.

Likewise, the pointer analysis for a well-typed program represents each function for the program with a single type and describes each function pointer for the program with a type representing the pointed-to function(s). If a function pointer may point to either one of two functions, the pointer analysis represents the two functions with the same type and describes the function pointer with the type representing both functions. If two function pointers may point to the same function, the pointer analysis describes each of the two function pointers with the type representing the pointed-to function.

The pointer analysis applies the typing constraints for a well-typed program based on store usages and function usages for the locations and functions for the program. The description of the pointer analysis with regard to store usages is similarly applicable to function usages where appropriate. For one embodiment, the pointer analysis identifies store usages based on the form of each program statement referencing one or more locations or functions. The pointer analysis describes locations and functions affected by the store usages with types in accordance with a type rule specifying the typing constraints for the statement form so the description of the store as defined by the store model is valid both before and after execution of the statement. If each program statement referencing one or more locations or functions is typed in this manner, or well-typed, the program is well-typed.

The pointer analysis implements polymorphic type inference by representing with a separate type the particular set of one or more locations passed as an actual or return parameter for each call or call site of a function in the program. The pointer analysis represents each formal and return parameter variable for a function with a generic type and identifies for each call site of the function the substitution of the type(s) representing the particular value(s) passed to or from the called function for the generic type(s) of the function. Using the above types, a generic type α may be described as a vectored type $\vec{\alpha}$ to denote the generic type α itself as well as a mapping from each call site to the type that may be substituted for the generic type α. For one embodiment, only location types may have substitution types. For another embodiment, both location and function types may have substitution types.

Figure 2:
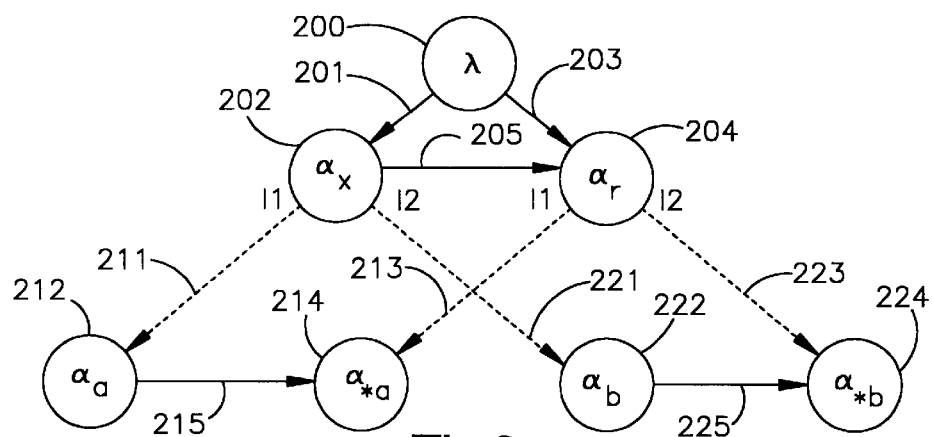
FIG. 2 illustrates for one embodiment a graphical representation of a function type for polymorphic type inference.

FIG. 2 illustrates for one embodiment a graphical representation of a function type λ representing the function f=fun(x)→(r) r=*x for the following sample program fragment.

$$f = \text{fun}(x) \rightarrow (r)$$
$$r = {}^*x;$$
...
$$11: \quad f(a);$$
$$12: \quad f(b);$$
...

The function type λ is represented by node 200 and comprises a generic type $\alpha_x$ represented by node 202, as indicated by a call-pattern edge 201 from node 200 to node 202, and a generic type $\alpha_r$ represented by node 204, as indicated by a call-pattern edge 203 from node 200 to node 204. Generic type $\alpha_x$ represents the value(s) of the formal parameter variable x for the function(s) represented by the function type λ, and generic type $\alpha_r$ represents the value(s) of the return parameter variable r or *x for the function(s) represented by the function type λ. A points-to edge 205 from node 202 to node 204 indicates the value(s) represented by the type $\alpha_x$ comprises a potential pointer to the location(s) containing the value(s) represented by the type $\alpha_r$ in accordance with the assignment of the content of the location pointed-to by the value of the formal parameter variable x to the return parameter variable r in the body of the function f(x).

Type $\alpha_a$ is represented by node 212 and represents the value of the variable a for the function call f(a) as indicated by a substitution edge 211 from node 202 to node 212. Type $\alpha_a$ is a substitution type for the generic type $\alpha_x$. Type $\alpha_{*a}$ is represented by node 214 and represents the value *a of the return variable for the function call f(a) as indicated by a substitution edge 213 from node 204 to node 214. Type $\alpha_{*a}$ is a substitution type for the generic type $\alpha_r$. Substitution edges 211 and 213 identify the calling context 11 for the function call f(a) in the program. In accordance with the function f(x), a points-to edge 215 from node 212 to node 214 indicates the value(s) represented by the type $\alpha_a$ comprises a potential pointer to the location(s) containing the value(s) represented by the type $\alpha_{*a}$.

Type $\alpha_b$ is represented by node 222 and represents the value of the variable b for the function call f(b) as indicated by a substitution edge 221 from node 202 to node 222. Type $\alpha_b$ is a substitution type for the generic type $\alpha_x$. Type $\alpha_{*b}$ is represented by node 224 and represents the value *b of the return variable for the function call f(b) as indicated by a substitution edge 223 from node 204 to node 224. Type $\alpha_{*b}$ is a substitution type for the generic type $\alpha_r$. Substitution edges 221 and 223 identify the calling context 12 for the function call f(b) in the program. In accordance with the function f(x), a points-to edge 225 from node 222 to node 224 indicates the value(s) represented by the type $\alpha_b$ comprises a potential pointer to the location(s) containing the value(s) represented by the type $\alpha_{*b}$.

A typing constraint on a generic type is likewise a typing constraint on each substitution type for the generic type. Using the above types, a constraint on a vectored type $\vec{\alpha}$ is a constraint on all of the types denoted by the type $\vec{\alpha}$, that is, on the generic type $\alpha$ and on each type substituted for the generic type $\alpha$. Any operation performed on a generic type in accordance with a type rule specifying a typing constraint on the generic type is therefore also performed by the pointer analysis on each substitution type for that generic type.

If two or more vectored types are subject to a typing constraint, the pointer analysis iterates over the call sites in the domain of the mappings for the vectored types and applies the typing constraint to those types that are from the same calling context. That is, each respective type in the co-domain of the mappings for the vectored types is subject to the same typing constraint. If the mappings for the vectored types have different domains during the pointer analysis, the pointer analysis creates new types in the mappings for the vectored types so that the mappings for the vectored types have the same domain.

Using the above types, the type rules for one embodiment for well-typed statements S are described as follows.

For a statement in the form x=y, the value of the variable y will have been assigned to the variable x after execution of the statement. Using the above types, the type rule for this statement form is described as:

$$\frac{A \vdash x : ref(\alpha_1) \quad A \vdash y : ref(\alpha_2) \quad \vec{\alpha}_2 = \vec{\alpha}_1}{A \vdash welltyped(x = y)}$$

That is, a statement in the form x=y is well-typed under the tpying environment A if the equality constraint $\vec{\alpha}_2 = \vec{\alpha}_1$ is satisfied, where the vectored type $\vec{\alpha}_1$ denotes the type $\alpha_1$ describing the value of the variable x and the mapping from call sites to substitution types for the type $\alpha_1$ and where the vectored type $\vec{\alpha}_2$ denotes the type $\alpha_2$ describing the value of the variable y and the mapping from call sites to substitution types for the type $\alpha_2$.

The typing environment A associates all variables for a program with a type and represents the store model for the program. A.x : $\tau$ holds true if and only if the variable x is associated with the type $\tau$ in the typing environment A.

Using the above types, an equality constraint $t_1 = t_2$ is satisfied if types $t_1$ and $t_2$ are the same or are both $\bot$. An equality constraint $(t_1 \times t_2) = (t_3 \times t_4)$ is satisfied if both the equality constraint $t_1 = t_3$ and the equality constraint $t_2 = t_4$ are satisfied.

The statement in the form x=y is well-typed under the typing environment A, then, if the location type component $\tau$ for the type $\alpha_2$ describing the value of the variable y is the same as the location type component $\tau$ for the type $\alpha_1$ describing the value of the variable x and if the function type component $\lambda$ for the type $\alpha_2$ is the same as the function type component $\lambda$ for the type $\alpha_1$. The value of the variable x and the value of the variable y are therefore to be described by the same location type and function types. This equality constraint is likewise applied for the respective substitution types for the types $\alpha_2$ and $\alpha_1$ at each call site as any constraint on the generic types $\alpha_2$ and $\alpha_1$ representing values inside a function is to be propagated to the substitution types representing values for each call of the function.

The type rules for the other statement forms for the well-typed statements S are described as follows.

$$\frac{A \vdash x : ref(\tau_1 x\_) \quad A \vdash y : \tau_2 \quad \vec{\tau}_1 = \vec{\tau}_2}{A \vdash welltyped(x = \&y)}$$

$$\frac{A \vdash x : ref(\alpha_1) \quad A \vdash y : ref(\tau_1 x\_) \quad \vec{\tau}_1 = ref(\vec{\alpha}_2) \quad \vec{\alpha}_2 = \vec{\alpha}_1}{A \vdash welltyped(x = {}^*y)}$$

$$\frac{A \vdash x : ref(\tau x\_) \quad \vec{\tau}_1 = ref(\_x\_)}{A \vdash welltyped(x = \text{allocate}(y))}$$

$$\frac{A \vdash x : ref(\tau_1 x\_) \quad \vec{\tau}_1 = ref(\vec{\alpha}_1) \quad A \vdash y : ref(\alpha_2) \quad \vec{\alpha}_2 = \vec{\alpha}_1}{A \vdash welltyped({}^*x = y)}$$

$$\frac{A \vdash x : ref(\alpha) \quad A \vdash y_i : ref(\alpha_i) \quad \forall i \in [1 \ldots n] : \vec{\alpha}_i = \vec{\alpha}}{A \vdash welltyped(x = op(y_1 \ldots y_n))}$$

$$\frac{\begin{array}{c} A \vdash x : ref(\_x\lambda) \\ \lambda = lam(\alpha_1 \ldots \alpha_n)(\alpha_{n+1} \ldots \alpha_{n+m}) \\ A \vdash f_i : ref(\alpha_i') \\ A \vdash r_j : ref(\alpha_{n+j}') \\ \forall k \in [1 \ldots n+m] : \vec{\alpha}_k = \vec{\alpha}_k' \\ \forall s \in S^* : A \vdash welltyped(s) \end{array}}{A \vdash welltyped(x = \text{fun}(f_1 \ldots f_n) \rightarrow (r_1 \ldots r_m)S^*)}$$

-continued $$A \vdash x_j : ref(\alpha_{n+j}')$$
$$A \vdash p : ref(\_x\lambda)$$
$$A \vdash y_i : ref(\alpha_i')$$
$$\lambda = lam(\alpha_1 \ldots \alpha_n)(\alpha_{n+1} \ldots \alpha_{n+m})$$
$$\forall k \in [1 \ldots n+m] : \alpha_k' \subset_1 \alpha_k$$

---

$$A \vdash welltyped(l: x_1 \ldots x_m = p(y_1 \ldots y_n))$$

For the above type rules, "__" is a wild-card or don't care value.

The above type rules, with the exception of the type rule for the function call statement form, are similar to the type rules of U.S. patent application Ser. No. 08/664,441, filed Jun. 18, 1996, entitled POINTER ANALYSIS BY TYPE INFERENCE COMBINED WITH A NON-POINTER ANALYSIS, by Bjarne Steensgaard, only the above type rules require an equality constraint as opposed to the inequality constraint ≦ described in U.S. patent application Ser. No. 08/664,441 and require that a vectored type for each type of interest is subject to the specified typing constraint as opposed to just the type of interest itself. The pointer analysis for other embodiments may use type rules requiring other constraints, such as for example the inequality constraint ≦ described in U.S. patent application Ser. No. 08/664,441. Also, the vectored type constraint $\vec{\tau}$=ref(__x__) for a statement in the form x=allocate(y) may be replaced with a non-vectored type constraint τ=ref(__x__) for another embodiment.

A statement in the function call statement form l: $x_1 \ldots x_m = p(y_1 \ldots y_n)$ is well-typed under the typing environment A if the constraint $\alpha_k' \subset_1 \alpha_k$ is satisfied for each corresponding type $\alpha_k'$ and $\alpha_k$ at the call site l, where the type $\alpha_k'$ describes the value of each respective variable $y_i$ and $x_j$ and the generic type $\alpha_k$ describes each respective formal and return parameter value for the called function.

For one embodiment, a constraint $(\tau_1 \times \lambda_1) \subset_1 (\tau_2 \times \lambda_2)$ is satisfied if the constraint $\tau_1 \subset_1 \tau_2$ is satisfied and if the constraint $\lambda_1 \subset \lambda_2$ is satisfied. The constraint $\tau_1 \subset_1 \tau_2$ is satisfied if the mapping for the vectored type $\vec{\tau}_2$ maps the call site l to the type $\tau_1$, that is, if $\tau_1$ is a substitution type for $\tau_2$ with respect to call site l. If $\tau_2$=ref($\alpha_2$), then the constraints $\tau_1$=ref($\alpha_1$) and $\alpha_1 \subset_1 \alpha_2$ must be satisfied for the constraint $\tau_1 \subset_1 \tau_2$ to be satisfied. If $\lambda_2$ is a non-⊥ function type, then $\lambda_1 = \lambda_2$ must be satisfied for the constraint $\lambda_1 \subset \lambda_2$ to be satisfied. If $\lambda_2$ is ⊥, then $\lambda_1 \subset \lambda_2$ is satisfied.

The statement in the function call statement form l: $x_1 \ldots x_m = p(y_1 \ldots y_n)$ is well-typed under the typing environment A, then, if the location type component τ' for the type $\alpha_k'$ describing the value of each respective variable $y_i$ and $x_j$ is a substitution type at the call site l for the location type component τ for the corresponding generic type $\alpha_k$ describing each respective formal and return parameter value for the called function and if the function type component λ for the generic type $\alpha_k$ is either ⊥ or is both non-⊥ and the same as the function type component λ' for the corresponding type $\alpha_k'$. If the generic type $\alpha_k$ describes a formal or return parameter value as a potential pointer, then the corresponding type $\alpha_k'$ must also describe the value of the respective variable $y_i$ or $x_j$ as a potential pointer. The type α describing the value(s) in the location(s) potentially pointed-to by the value of the variable $y_i$ or $x_j$ must also be a substitution type for the type α describing the value(s) in the location(s) potentially pointed-to by the respective formal or return parameter value.

For another embodiment, the constraint $(\tau_1 \times \lambda_1) \subset_1 (\tau_2 \times \lambda_2)$ is satisfied if the constraint $\tau_1 \subset_1 \tau_2$ is satisfied and if $\lambda_1 = \lambda_2$.

The pointer analysis for one embodiment does not substitute any types for types representing globally accessible locations or functions. A location or function accessible by a global variable in a program or by following pointers from a global variable in the program is globally accessible. Using the above types, a type t representing a globally accessible location or function may be described as a vectored type $\vec{t}$ for convenience of notation with the substitution mapping for the vectored type $\vec{t}$ mapping each call site to the type t.

Analysis

The terminating polymorphic type inference pointer analysis for one embodiment supplements Henglein's semi-algorithm as described, for example, in Henglein, F., "Type Inference with Polymorphic Recursion," *ACM Transactions on Programming Languages and Systems*, Vol. 15, No. 2, pp. 253–289 (April 1993). In analyzing a program, the analysis generates and maintains a graph of nodes, similar to the graph of FIG. 2 for example, where nodes in the graph represent types representing sets of locations or functions for the program. The graph represents the store model for the program.

The pointer analysis defines a points-to edge from a source node to a destination node in the graph to represent that the location(s) represented by the source node may contain a pointer to the location(s) or function(s) represented by the destination node. As an example, FIG. 2 illustrates points-to edges 205, 215, and 225. The pointer analysis also defines a call-pattern edge from a source node to a destination node in the graph to represent the value represented by the destination node as a formal or return parameter for the function represented by the source node. The pointer analysis for one embodiment may label each call-pattern edge to distinguish among different formal and return parameter values for the function represented by the source node. With reference to FIG. 2, call-pattern edges 201 and 203 may be labeled differently so the pointer analysis can distinguish between the formal parameter variable x and the return parameter variable r. Points-to edges and call-pattern edges are described in U.S. patent application Ser. No. 08/664,441.

The pointer analysis further defines a substitution edge from a source node to a destination node in the graph, as described above with reference to FIG. 2, to represent that a set of one or more values represented by the source node represents a set of one or more particular values represented by the destination node for a particular calling context of a function. The source node of the substitution edge represents a set of formal or return parameter value(s) for the function or represents a set of one or more values reachable by one or more pointers from a formal or return parameter value for the function. Substitution edges each represent the calling context for a particular set of calls of a function (for example, all calls from a particular call site). The pointer analysis for one embodiment may color or label each substitution edge to distinguish among calling contexts for a given function. The pointer analysis may use an indication of a specific syntactic call site, for example, as a color or label for a substitution edge. With reference to FIG. 2, substitution edges 211 and 213 may be colored or labeled differently from substitution edges 221 and 223 so the pointer analysis can distinguish the calling context for f(a) from the calling context for f(b). Substitution edges are also referred to as arrow edges or shadow edges.

To satisfy the $\subset_1$ constraint for each function call in the program, the pointer analysis for one embodiment applies any constraint on a generic type to each substitution type for that generic type, for example, by propagating to the destination node of a substitution edge any constraints represented by outgoing points-to edges from the source node or represented by the joining of the source node with another node. The destination node for any outgoing points-to edge from a source node having an outgoing substitution edge is also to have an outgoing substitution edge for the same calling context. The substitution node for the source node of a points-to edge is to have an outgoing points-to edge to the substitution node for the same calling context of the destination node of that points-to edge. A generic node will have at most one outgoing substitution edge for a particular calling context.

Figure 3:
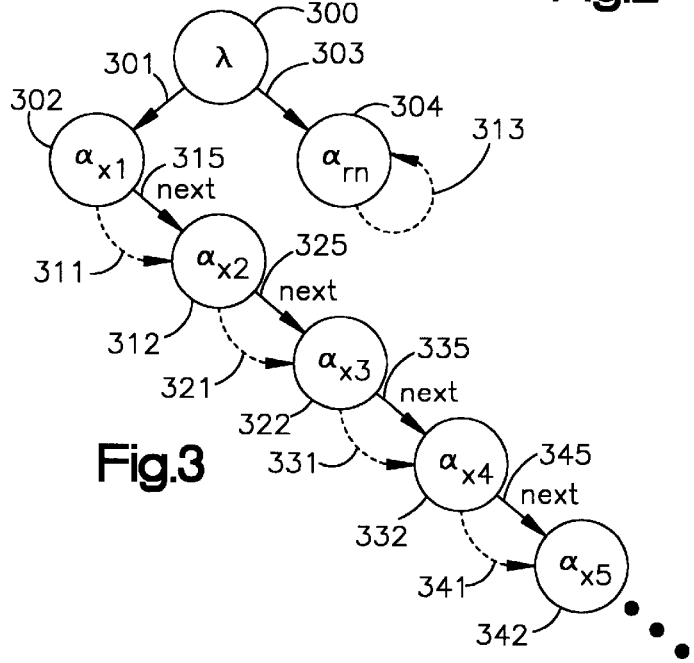
FIG. 3 illustrates for one embodiment a graphical representation of a function type for a non-terminating polymorphic type inference analysis.

FIG. 3 illustrates for one embodiment a graphical representation of a function type $\lambda$ representing the following function.

$$f = \text{fun}(x) \to (r)$$

$$\text{struct} = {}^*x:$$

$$y = \text{struct.next}$$

$$r = f(y);$$

A typical polymorphic type inference pointer analysis analyzing this function enters a non-terminating or infinite loop in propagating constraints from the generic type representing the formal parameter value for the function f(x) to the types representing the values for each call of f(y).

The function type $\lambda$ representing the function f is represented by node 300 and comprises a generic type $\alpha_{x1}$ represented by node 302, as indicated by a call-pattern edge 301 from node 300 to node 302, and a generic type $\alpha_{r1}$ represented by node 304, as indicated by a call-pattern edge 303 from node 300 to node 304. Generic type $\alpha_{x1}$ represents the value of the formal parameter variable x for the function f represented by the function type $\lambda$, and generic type $\alpha_{r1}$ represents the value of the return parameter variable r for the function f represented by the function type $\lambda$.

Because the value of the variable y=struct.next (=(*x).next=x->next) in the call of f(y) is in a location pointed to by the value of the variable x, the analysis represents the value of y with a type $\alpha_{x2}$ represented by a destination node 312 of a points-to edge 315 from node 302. For the function call f(y), the analysis defines a substitution edge 311 from node 302 to node 312 as the generic type $\alpha_{x1}$ representing the formal parameter value for the function f(x) represents the particular value of y=struct.next (=x->next) for the function call f(y). The analysis also represents the return parameter value for the function call f(y) with a type $\alpha_{r2}$ represented by node 304 and defines a substitution edge 313 from node 304 back to node 304 as the generic type $\alpha_{r1}$ representing the return parameter value for the function f(x) represents the particular return parameter value for the function call f(y). Because of the typing constraint imposed by the statement r=f(y), the generic type $\alpha_{r1}$ and the type $\alpha_{rn}$ representing the return parameter value for each function call f(y) are represented by the same node 304.

As the type $\alpha_{x2}$ is a substitution type for the type $\alpha_{x1}$, the analysis propagates the constraint on the type $\alpha_{x1}$, as represented by outgoing points-to edge 315 from node 302, to the type $\alpha_{x2}$ with an outgoing points-to edge 325 from node 312 to a node 322. Node 322 represents a type $\alpha_{x3}$ representing the value(s) in the location(s) pointed-to by the value(s) represented by the type $\alpha_{x2}$. The analysis also represents the type $\alpha_{x3}$ as a substitution type for the type $\alpha_{x2}$ with a substitution edge 321 from node 312 to node 322 because the type $\alpha_{x3}$ describing the value(s) in the location(s) pointed-to by the parameter value(s) passed to the called function must be a substitution type for the type $\alpha_{x2}$ describing the value(s) in the location(s) pointed-to by the value(s) of the formal parameter x. Substitution edge 321 represents that the location x->next in the recursive call f(y) corresponds to the location y->next (=x->next->next) at the recursive call site inside the body of the function f.

Similar to the representation of the type $\alpha_{x3}$, the analysis represents the type $\alpha_{x4}$ with a node 332 as the destination node of a points-to edge 335 from node 322 and as the destination node of a substitution edge 331 from node 322. The analysis represents the type $\alpha_{x4}$ as a substitution type for the type $\alpha_{x3}$ because the type $\alpha_{x4}$ describes value(s) in location(s) reachable by pointers from the parameter value (s). Substitution edge 331 represents that the location x->next->next in the recursive call f(y) corresponds to the location y->next->next (=x->next->next) at the recursive call site inside the body of the function f. The analysis likewise represents the type $\alpha_{x5}$ with a node 342 as the destination node of a points-to edge 345 from node 332 and as the destination node of a substitution edge 341 from node 332. Substitution edge 341 represents that the location x->next->next->next in the recursive call f(y) corresponds to the location y->next->next->next (=x->next->next->next->next) at the recursive call site inside the body of the function f. The analysis continues to generate the graph in this manner for the subsequent recursive calls for the function f(x).

The graph of FIG. 3 represents a principal typing for the function f and is desirable as a relatively more accurate approximation of the store usage for the function. Because the principal typing for the function f is infinite in size due to the recursively called function, however, the analysis attempts to expand the graph infinitely in a non-terminating loop.

A terminating polymorphic type inference analysis determines when the analysis has entered a potential non-terminating loop and modifies the graph to ensure the analysis will terminate. The analysis may generate a potentially more conservative approximation of the store usage for a program and therefore may not infer the principal typing for the program. The analysis, however, will terminate and generate a usable finite graph for programs regardless of whether the principal typing for the program is infinite in size.

Figure 4:
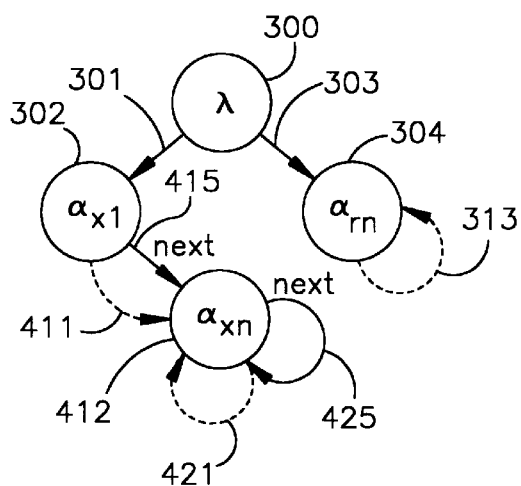
FIG. 4 illustrates for one embodiment a graphical representation of a function type for a terminating polymorphic type inference analysis.

FIG. 4 illustrates for one embodiment a graphical representation of the function type $\lambda$ representing the function f(x) for a terminating polymorphic type inference analysis.

As illustrated in FIG. 4, the analysis determines a potential non-terminating loop has been entered when the analysis detects the propagation of constraints from the generic type $\alpha_{x1}$ to the type $\alpha_{x2}$. The analysis then represents the types $\alpha_{x2}, \alpha_{x3}, \alpha_{x4}, \alpha_{x5}, \ldots \alpha_{xn}$ for the function f(x) with a single node 412 rather than recursively representing these types with separate nodes 312, 322, 332, 342, etc. as illustrated in FIG. 3.

Node 412 is the destination node of both a points-to edge 415 from node 302 and a substitution edge 411 from node 302. Node 412 is also both a source node and a destination node for both a points-to edge 425 and a substitution edge 421. By cycling points-to edge 425 and substitution edge 421 from node 412 onto itself, the analysis represents the store usage for the recursive function while avoiding a non-terminating infinite expansion of the graph.

Figure 5:
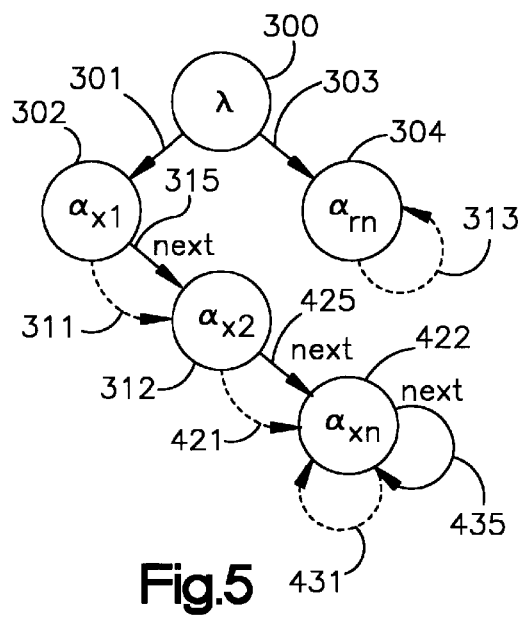
FIG. 5 illustrates for another embodiment a graphical representation of a function type for a terminating polymorphic type inference analysis.

FIG. 5 illustrates for another embodiment a graphical representation of the function type $\lambda$ representing the function f(x) for a terminating polymorphic type inference analysis.

As illustrated in FIG. 5, the analysis determines a potential non-terminating loop has been entered when the analysis detects the propagation of constraints from the generic type $\alpha_{x1}$ to the type $\alpha_{x2}$ triggers a similar propagation of constraints from the type $\alpha_{x2}$ to the type $\alpha_{x3}$. The analysis then represents the types $\alpha_{a3}, \alpha_{x4}, \alpha_{x5}, \ldots \alpha_{xn}$ for the function f(x) with a single node 422 rather than recursively representing these types with separate nodes 322, 332, 342, etc. as illustrated in FIG. 3. Node 422 is the destination node of both points-to edge 425 from node 312 and substitution edge 421 from node 312. Node 422 is also both a source node and a destination node for both a points-to edge 435 and a substitution edge 431. By cycling points-to edge 435 and substitution edge 431 from node 422 onto itself, the analysis represents the store usage for the recursive function while avoiding a non-terminating infinite expansion of the graph.

The graph of FIG. 5 represents a relatively more accurate approximation of the store usage for the function f as compared to FIG. 4. The analysis for other embodiments may define a graph representing relatively more accurate approximations of the store usage for the function f as compared to FIG. 5 by representing relatively more actual parameter values with separate types or nodes prior to modifying the graph to ensure termination of the analysis.

Figure 6:
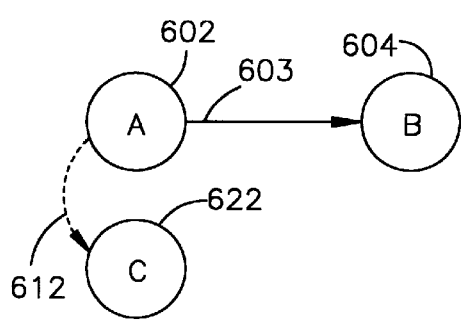
FIG. 6 illustrates a graphical representation for one example of an incomplete pointer substitution configuration.

In processing a graph, the analysis for one embodiment determines whether store usages for function calls in the program comply with the $\subset_1$ constraint by determining whether the graph comprises an incomplete pointer substitution configuration of nodes and edges. FIG. 6 illustrates a graphical representation for one example of an incomplete pointer substitution configuration. As illustrated in FIG. 6, the incomplete pointer substitution configuration comprises an A node 602 having an outgoing points-to edge 603 to a B node 604 and having an outgoing substitution edge 612 to a C node 622.

Figure 7:
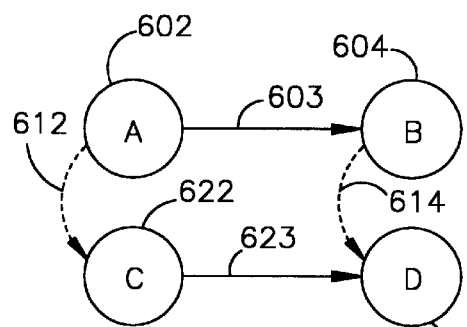
FIG. 7 illustrates a graphical representation for one example of a complete pointer substitution configuration.

The analysis completes the pointer substitution configuration in such a manner so as to satisfy the $\subset_1$ constraint for the pointer substitution configuration. FIG. 7 illustrates a graphical representation for one example of a complete pointer substitution configuration. The analysis completes the configuration of FIG. 6 with a D node 624, with a points-to edge 623 from C node 622 to D node 624, and with a substitution edge 614 from B node 604 to D node 624 as illustrated in FIG. 7 to form a complete pointer substitution configuration. Substitution edges 612 and 614 represent the same calling context for the complete pointer substitution configuration and therefore have the same color or label. The analysis for one embodiment may complete the pointer substitution configuration by creating a new node, by adding a suitable points-to edge, by adding a suitable substitution edge, and/or by unifying nodes. The A, B, C, and D nodes are illustrated in FIGS. 6 and 7 as separate nodes 602, 604, 622, and 624, respectively, but two or more of the A, B, C, and D nodes may be the same node in the graph.

For other embodiments, a terminating polymorphic type inference program analysis may complete other suitable substitution configurations for type systems supporting substitution types for function types or supporting suitable type constructors other than location and function type constructors. For each substitution configuration in a graph formed by a node and each combination of an outgoing substitution edge with an outgoing type constructor edge, the analysis may complete a quadrilateral substitution configuration with two similar type constructor edges and two substitution edges having the same color or label.

Because the analysis may enter a potential non-terminating loop in completing substitution configurations, the analysis determines whether the analysis has entered a potential non-terminating loop while detecting and completing substitution configurations and modifies the graph so the store usages for the current typing environment are well-typed while ensuring the analysis will terminate.

Figure 8:
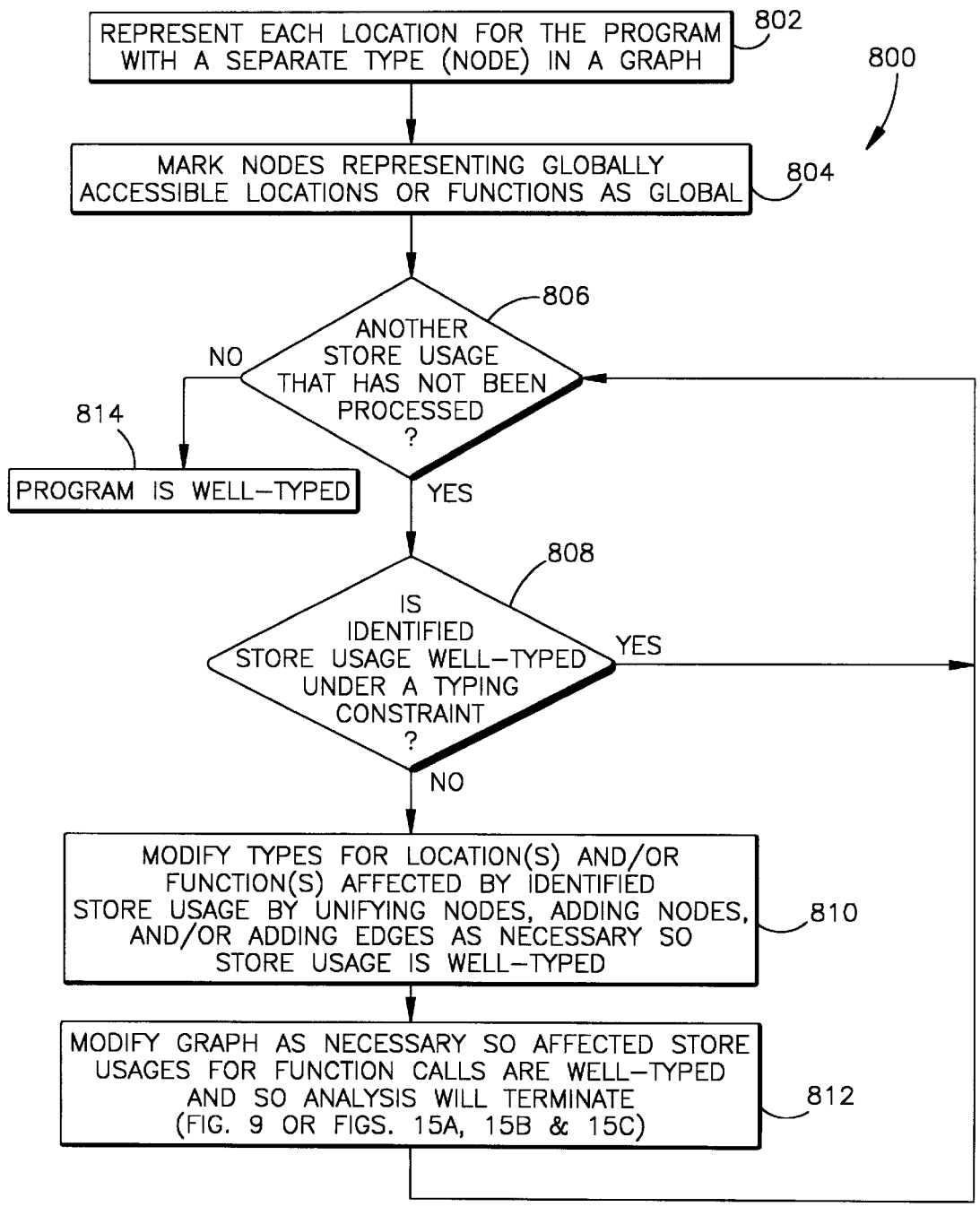
FIG. 8 illustrates for one embodiment a flow diagram for performing a terminating polymorphic type inference pointer analysis for a program.

FIG. 8 illustrates for one embodiment a flow diagram 800 for performing a pointer analysis for a program using a terminating polymorphic type inference analysis. The pointer analysis of FIG. 8 may supplement the pointer analyses of U.S. patent application Ser. Nos. 08/664,441 and 08/719,144.

For step 802 of FIG. 8, the analysis represents each location for the program with a separate type in a graph of nodes to define a typing environment for the program. Each node in the graph represents a type. The analysis for one embodiment identifies each location for the program using a symbol table having recorded identifiers for each variable for the program.

For step 804, the analysis marks nodes representing globally accessible locations or functions as global so the analysis does not substitute any types for types representing globally accessible locations or functions. The analysis for one embodiment identifies globally accessible locations or functions by identifying global variables in the program.

For step 806, the analysis identifies a store usage that is described by the program and has not been processed by the analysis. The analysis for one embodiment identifies the form of a statement of the program to identify the store usage or usages described by the statement.

If the analysis identifies a store usage that has not been processed, the analysis for step 808 determines whether the location(s) and/or function(s) affected by the identified store usage are well-typed for the current typing environment under a typing constraint. For one embodiment, the analysis determines whether the program statement describing the identified store usage(s) is well-typed for the current typing environment in accordance with a type rule specifying the typing constraint for the form of the statement. If the analysis determines an identified store usage is well-typed, the analysis proceeds to process another store usage for step 806.

If the analysis for step 808 determines the identified store usage is not well-typed for the current typing environment under the typing constraint, the analysis for step 810 modifies types for location(s) and/or function(s) affected by the identified store usage as necessary so the store usage is well-typed under the typing constraint. For one embodiment, the analysis modifies types in accordance with a type rule specifying the typing constraint for the form of the program statement describing the identified store usage. The analysis modifies types for one embodiment by unifying nodes, adding nodes, and/or adding edges to the graph. For other embodiments, the analysis may also modify types in accordance with the type inference pointer analyses of U.S. patent application Ser. No. 08/664,441 and U.S. patent application Ser. No. 08/719,144.

Figure 9:
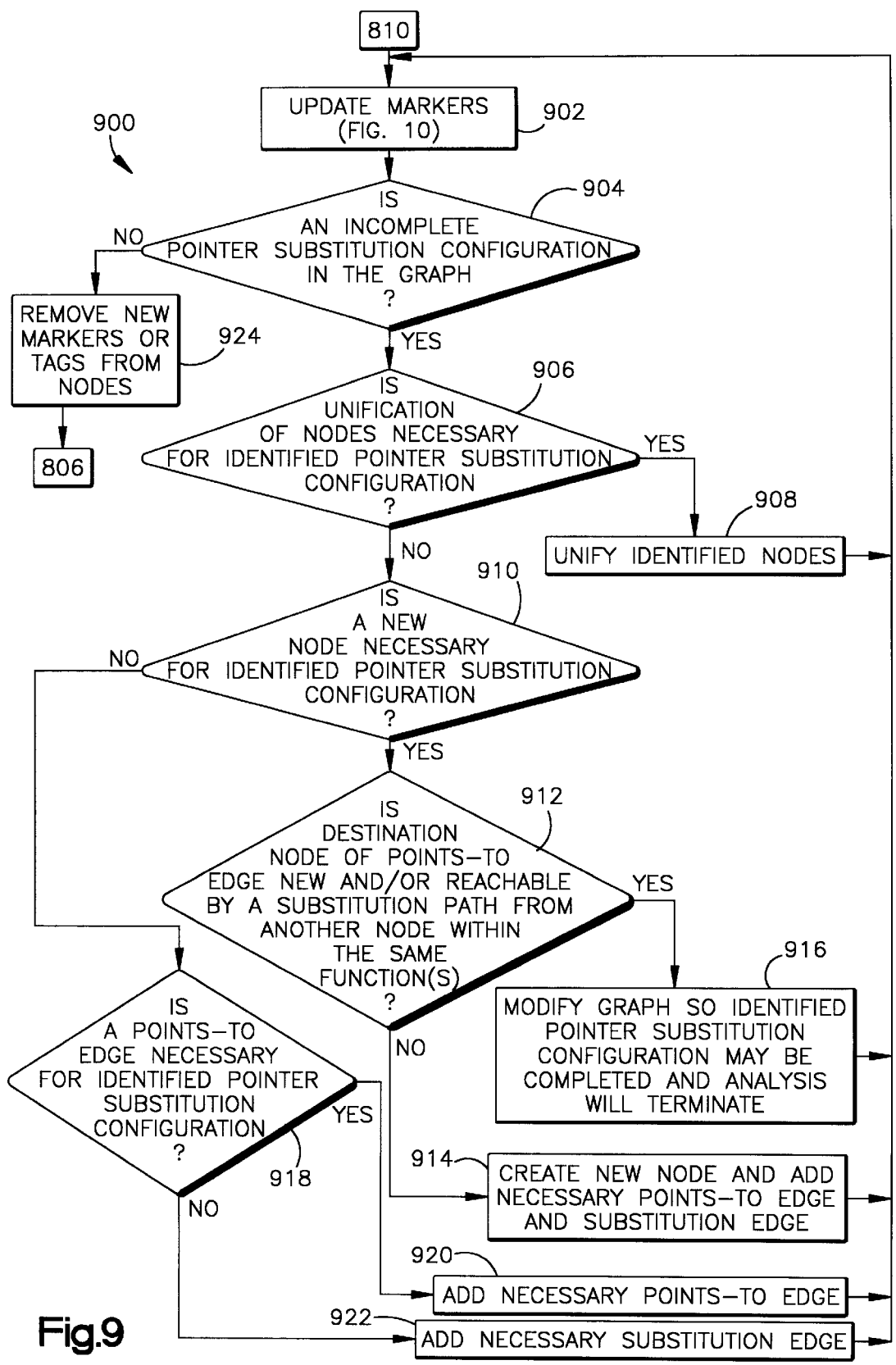
FIG. 9 illustrates for one embodiment a flow diagram for modifying a graph for the flow diagram of FIG. 8.
Figure 15A:
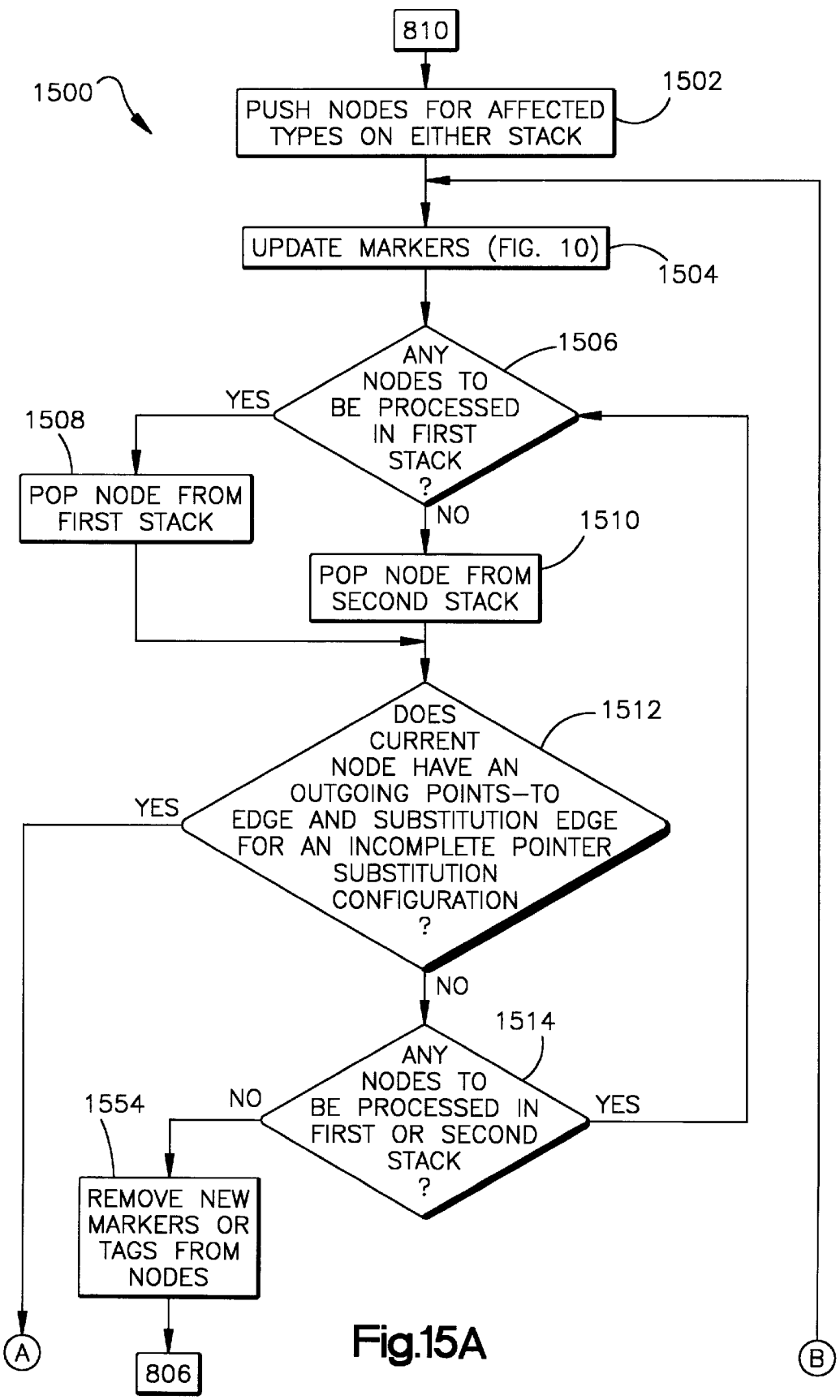
FIGS. 15A, 15B, and 15C illustrate for another embodiment a flow diagram for modifying a graph for the flow diagram of FIG. 8.
Figure 15B:
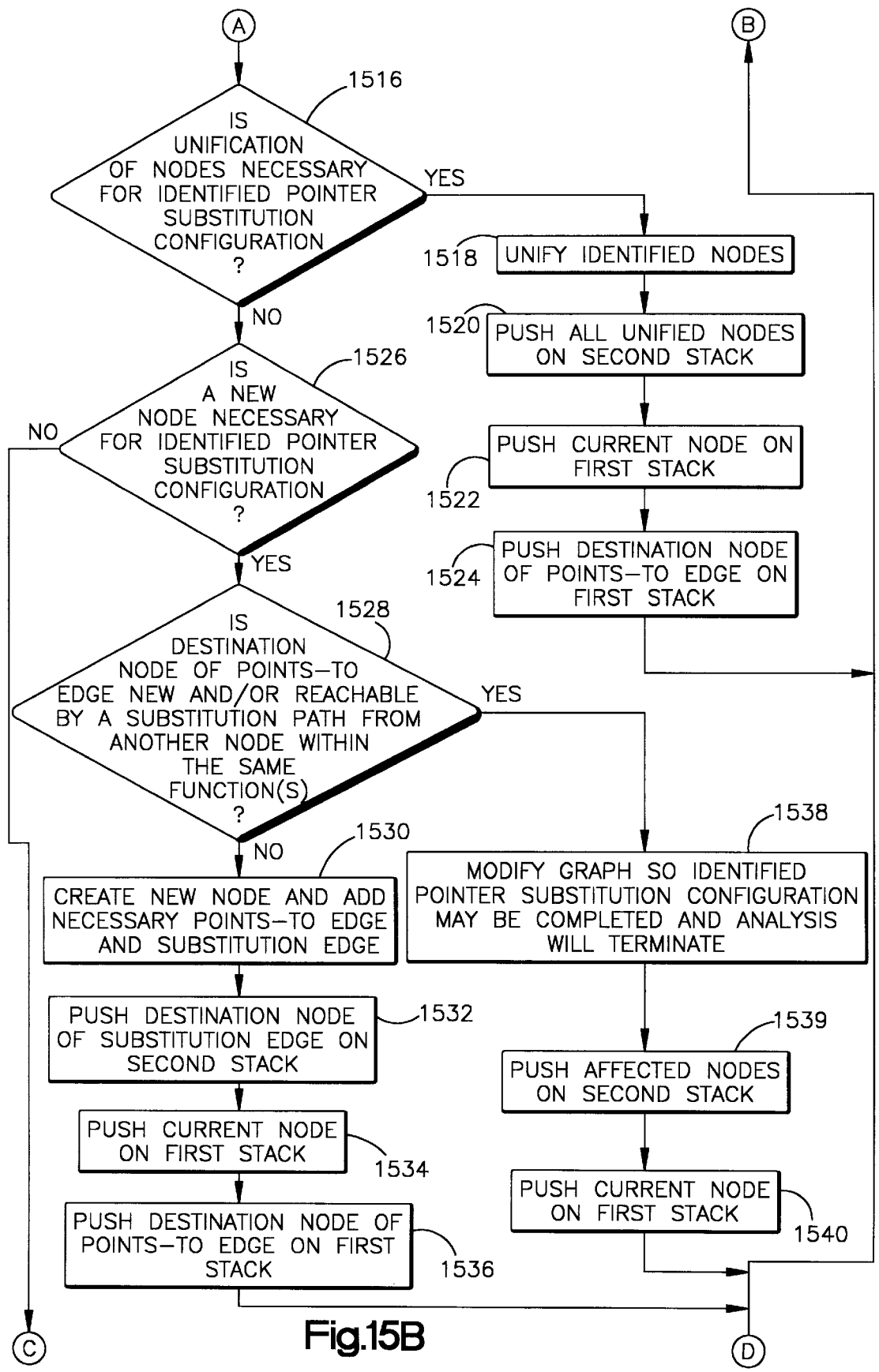
Figure 15C:
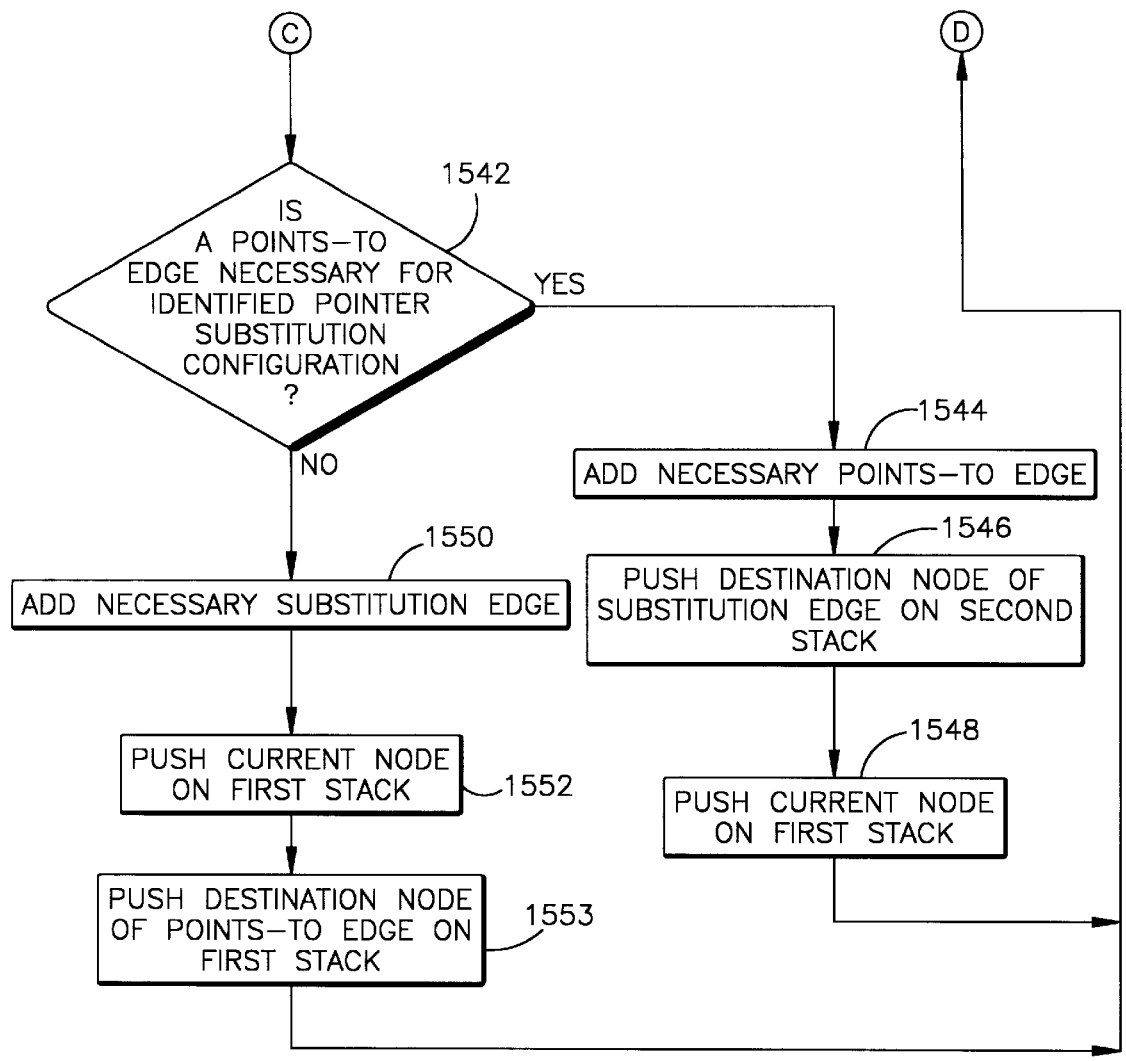

Because the modification of types for step 810 may affect the types for one or more previously processed store usages for a function call in the program, the analysis for step 812 modifies the graph as necessary so the store usages for previously processed function calls in the program are well-typed for the current typing environment. The analysis for one embodiment modifies the graph as necessary so the $\subset_1$ constraint for each previously processed function call in the program is satisfied for the current typing environment. In modifying the graph for step 812, the analysis also determines whether the analysis has entered a potential non-terminating loop and modifies the graph to ensure the analysis will terminate. FIG. 9 illustrates a flow diagram 900 for one embodiment for modifying the graph for step 812. FIGS. 15A, 15B, and 15C illustrates a flow diagram 1500 for another embodiment for modifying the graph for step 812.

In modifying the graph for steps 810 and 812, the analysis for one embodiment identifies nodes marked global so the analysis does not define a separate substitution node for any nodes marked global. The analysis for another embodiment may represent a substitution node for a node marked global with the marked node itself.

The analysis for steps 810 and 812 also updates global markers for the graph to identify nodes representing globally accessible locations or functions as a result of the modification of the graph for step 810 and/or step 812. The analysis, for example, identifies and marks as global the destination node of a points-to edge from a node marked global because the location(s) or function(s) represented by the destination node may be globally accessible through the points-to edge.

The analysis proceeds to process another store usage for steps 806 through 812 until the analysis determines for step 806 that all store usages for the program have been processed. The analysis for one embodiment determines whether the last statement referencing a location and/or function for the program has been identified. When the analysis has processed all store usages for the program, the program is well-typed for step 814. The resulting graph or set of types define the store model for the program and is a valid description of all possible run-time storage configurations for the program.

For one embodiment, the analysis for FIG. 8 may process each store usage described by the program in any order independent of program control flow as defined by the control flow structures for the program. The analysis processes each store usage for the program only one time.

Referring to flow diagram 900 of FIG. 9, the analysis for one embodiment may modify the graph for step 812 of FIG. 8 by determining whether the graph comprises any incomplete pointer substitution configurations of nodes and edges as a result of the modification of the graph for step 810 of FIG. 8 and by completing each pointer substitution configuration in the graph.

For step 902 of FIG. 9, the analysis updates node markers in the graph for nodes representing types affected by the modification of the graph for step 810 of FIG. 8. The analysis for one embodiment updates node markers in accordance with a flow diagram 1000 of FIG. 10.

Figure 10:
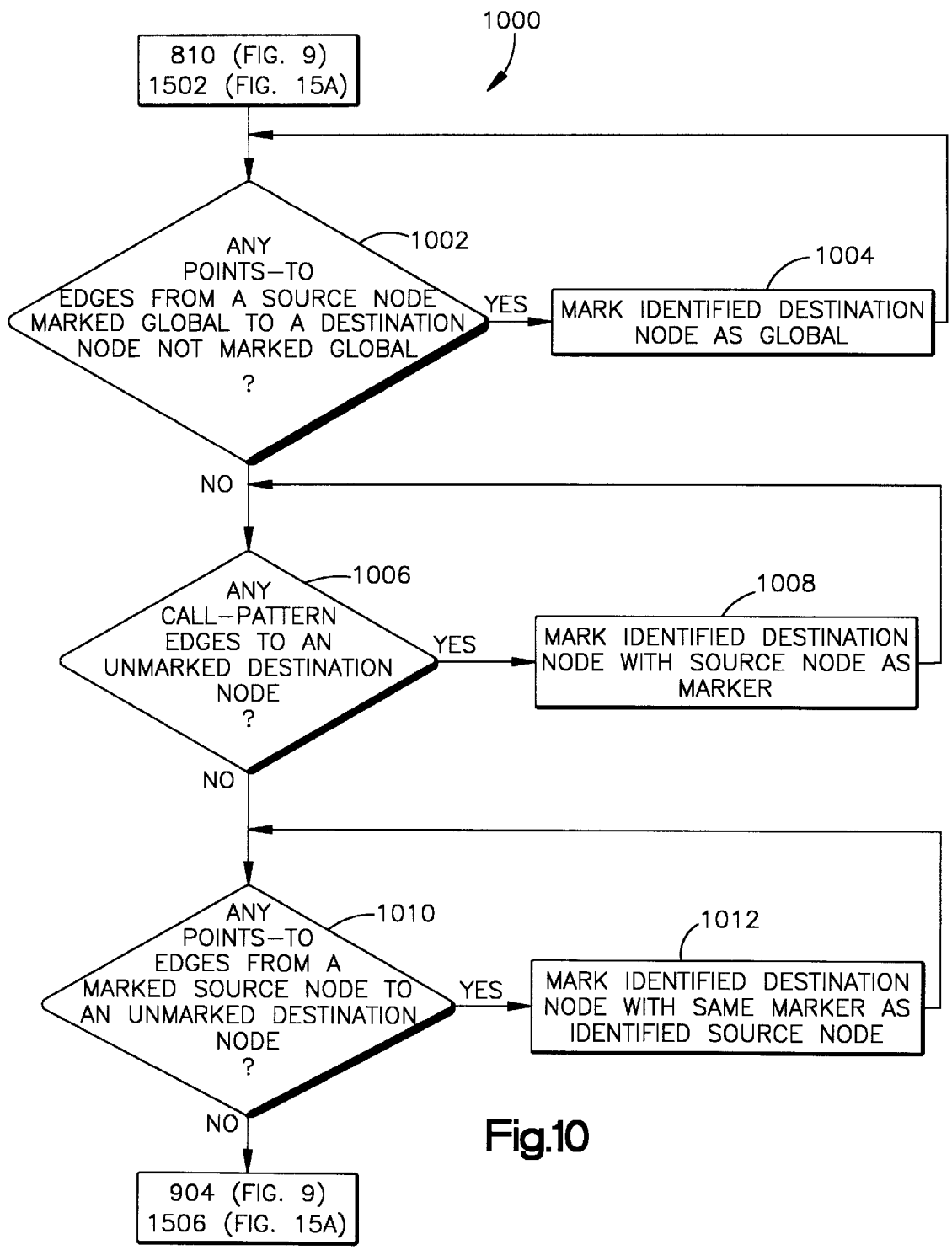
FIG. 10 illustrates for one embodiment a flow diagram for updating node markers for the flow diagram of FIGS. 9 and for the flow diagram of FIGS. 15A, 15B, and 15C.

Referring to flow diagram 1000 of FIG. 10, the analysis for step 1002 determines whether the graph comprises any points-to edges from a source node marked global to a destination node that is not marked global. If so, the analysis for step 1004 marks the destination node of the identified points-to edge as global because the location(s) or function(s) represented by the destination node may be globally accessible through the identified points-to edge. The analysis repeats steps 1002 and 1004 to identify and mark any other destination nodes representing locations or functions globally accessible through a points-to edge.

If the destination nodes of points-to edges from nodes marked global are properly marked global for step 1002, the analysis for step 1006 determines whether the graph comprises any call-pattern edges to an unmarked destination node. If so, the analysis for step 1008 marks the destination node of the identified call-pattern edge with the source node of the identified call-pattern edge as a marker to identify the function(s) within which the destination node represents values. Nodes are marked in this manner for one embodiment to help the analysis determine whether the analysis has entered a potential non-terminating loop. The analysis repeats steps 1006 and 1008 to identify and mark any other unmarked destination nodes of call-pattern edges.

If the destination nodes of call-pattern edges in the graph are properly marked for step 1006, the analysis for step 1010 determines whether the graph comprises any points-to edges from a marked source node to an unmarked destination node. If so, the analysis for step 1012 marks the destination node of the identified points-to edge with the same marker with which the source node of the identified points-to edge is marked to identify the function(s) within which the destination node represents values. The analysis repeats steps 1010 and 1012 to identify and mark any other unmarked destination nodes of points-to edges.

If the destination nodes of points-to edges in the graph are properly marked for step 1010, the analysis has updated the node markers in the graph.

For step 904 of FIG. 9, the analysis determines whether the graph comprises any incomplete pointer substitution configurations. The analysis for one embodiment identifies any nodes in the graph that have both an outgoing points-to edge and an outgoing substitution edge and, if so, determines whether the pointer substitution configuration formed by the identified node and edges is complete as illustrated in FIG. 7, for example. For nodes having more than one outgoing points-to edge and/or more than one outgoing substitution edge, the analysis determines whether the pointer substitution configuration formed by the identified node and each combination of an outgoing substitution edge with an outgoing points-to edge is complete.

If the graph does not comprise any incomplete pointer substitution configurations, the analysis has determined that the store usages for each function call in the program are well-typed and all processed store usages are well-typed for the current typing environment.

Figure 11:
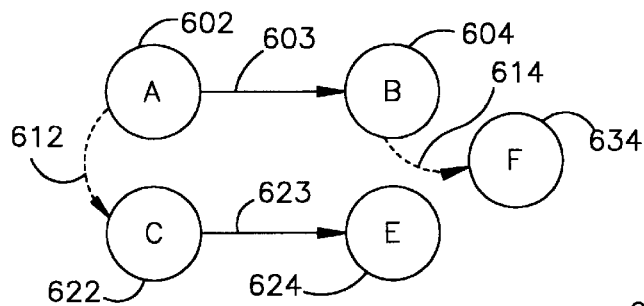
FIG. 11 illustrates a graphical representation for another example of an incomplete pointer substitution configuration.

If the graph comprises an incomplete pointer substitution configuration, the analysis for step 906 determines whether the unification of nodes is necessary for completion of the identified pointer substitution configuration. FIG. 11 illustrates a graphical representation for one example of an incomplete pointer substitution configuration requiring the unification of nodes. The analysis identifies the pointer substitution configuration by determining, as illustrated in FIG. 11, A node 602 has outgoing points-to edge 603 to B node 604 and has outgoing substitution edge 612 to C node 622. The analysis also identifies C node 622 having outgoing points-to edge 623 to an E node 624, B node 604 having outgoing substitution edge 614 to an F node 634, and substitution edges 612 and 614 having the same color or label.

If unification is necessary for step 906, the analysis for step 908 unifies the nodes identified as necessary for completion of the identified pointer substitution configuration. For the example of FIG. 11, the analysis unifies E and F nodes 624 and 634 into D node 624 to complete the pointer substitution configuration as illustrated in FIG. 7. If one of the nodes being unified is marked as global, the analysis marks the unified node as global. If neither one of the nodes being unified is marked as global, the analysis may either leave the unified node unmarked or mark the unified node similarly as either one of the nodes being unified. The analysis then proceeds to step 902 to update node markers in the graph for nodes representing types affected by the modification of the graph for step 908 and further process any incomplete pointer substitution configurations in the graph.

If unification is not necessary for step 906, the analysis for step 910 determines whether a new node is necessary for completion of the identified incomplete pointer substitution configuration. FIG. 6 illustrates a graphical representation for one example of an incomplete pointer substitution configuration requiring a new node.

If a new node is necessary for step 910, the analysis determines for step 912 whether the analysis will enter a potential non-terminating loop.

The analysis for one embodiment determines a potential non-terminating loop has been entered for step 912 if the destination node of the points-to edge in the identified pointer substitution configuration was created during the modification of the graph for flow diagram 900 of FIG. 9 and, if so, if that new destination node was created under conditions similar to those under which another node or nodes in the graph was created.

The analysis for one embodiment determines whether a node was created during the modification of the graph for flow diagram 900 by marking the node as new when the node is created during the analysis for flow diagram 900. If the analysis unifies a node marked new with another node for step 908, the analysis for one embodiment marks the unified node as new. For another embodiment, the analysis marks the unified node as new only if both nodes being unified are marked new. The new markers are later removed for step 924 of FIG. 9.

The analysis for one embodiment may identify whether the destination node of the points-to edge in the identified pointer substitution configuration was created under conditions similar to those under which another node or nodes in the graph was created if the destination node of the points-to edge is reachable by a substitution path along one or more substitution edges from another node representing one or more locations within the same function(s) as the destination node of the points-to edge. The analysis identifies the marker of the destination node of the points-to edge and the marker of each node along any substitution path to the identified destination node to determine whether the pair of nodes represent locations within the same function.

For one embodiment, the analysis traverses all paths of substitution edges ending at the destination node of the points-to edge and identifies any nodes on these paths having the same marker as the destination node of the points-to edge.

For another embodiment, the analysis identifies any nodes having the same marker as the destination node of the points-to edge from a set of nodes with which the destination node of the points-to edge is tagged. The analysis tags each node created during modification of the graph for step 810 of FIG. 8 and for flow diagram 900 of FIG. 9 with the source node from which the tagged node was created as the destination node of a substitution edge and with the set of nodes with which the source node is tagged. If the analysis unifies a tagged node with another node for step 908, the analysis tags the unified node with the union of the tags for each node being unified. For one embodiment, all tags may be removed for step 924 of FIG. 9.

For one or more embodiments, the analysis may require that the substitution path start with a substitution edge having the same color or label as the substitution edge in the identified pointer substitution configuration.

The analysis for another embodiment may determine a potential non-terminating loop has been entered for step 912 if the destination node of the points-to edge is reachable by a substitution path along one or more substitution edges from another node representing one or more locations within the same function(s) as the destination node of the points-to edge regardless of whether the destination node of the points-to edge in the identified pointer substitution configuration was created during the modification of the graph for flow diagram 900 of FIG. 9.

The analysis for yet another embodiment may determine a potential non-terminating loop has been entered for step 912 if the destination node of the points-to edge in the identified pointer substitution configuration was created during the modification of the graph for flow diagram 900 of FIG. 9, if the destination node of the points-to edge is reachable by a substitution path along one or more substitution edges from another node representing one or more locations within the same function(s) as the destination node of the points-to edge, and if an origin set for the destination node of the points-to edge and an origin set for the identified node along the substitution path are overlapping or non-disjoint. The origin set for a node is the set of syntactic origins associated with nodes reachable along a substitution path. The analysis for one embodiment adds origins to a node in the graph similarly as described in Talpin, J., et al., "Syntactic Control of Type Polymorphism for Recursive Function Definitions," Technical Report ECRC-94-29, European Computer-Industry Research Centre GmbH, pp. I–III, 1–15, i–xiv (July 1994, revised February, 1995). The analysis for one embodiment computes origin sets for nodes only as necessary to ensure the analysis will terminate. For another embodiment, the origin sets may be expressed in terms of non-new nodes and edges in the graph instead of syntactic labels from the program being analyzed.

If the conditions for step 912 are not satisfied, the analysis for step 914 creates a new node and adds the necessary points-to edge and substitution edge to complete the identified pointer substitution configuration. For the example of FIG. 6, the analysis creates D node 624, adds points-to edge 623 from C node 622 to D node 624, and adds substitution edge 614 from B node 604 to D node 624 to complete the pointer substitution configuration as illustrated in FIG. 7. For embodiments using new markers, the analysis for step 914 marks the created node as new. For embodiments using tags, the analysis for step 914 tags the created node with the source node from which the tagged node was created as the destination node of a substitution edge and with the set of nodes with which the source node is tagged. The analysis then proceeds to step 902 to update node markers in the graph for nodes representing types affected by the modification of the graph for step 914 and further process any incomplete pointer substitution configurations in the graph.

If the conditions for step 912 are satisfied, the analysis has determined the analysis has entered a potential non-terminating loop and for step 916 modifies the graph so the identified pointer substitution configuration may be completed while ensuring the analysis will terminate.

For embodiments where the analysis determines for step 912 whether the destination node of the points-to edge is reachable by a substitution path along one or more substitution edges from another node representing one or more locations within the same function(s) as the destination node of the points-to edge, the analysis for one embodiment for step 916 copies to the destination node of the points-to edge for the identified pointer substitution configuration all substitution edges on the identified node along the substitution path. The analysis for one embodiment identifies the first or closest node along the substitution path for which the conditions for step 912 are satisfied.

Figure 12:
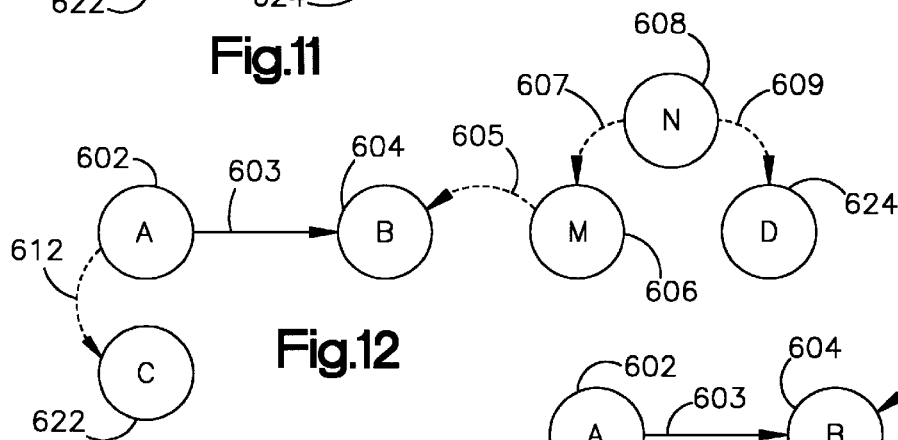
FIG. 12 illustrates a graphical representation for another example of an incomplete pointer substitution configuration.

FIG. 12 illustrates a graphical representation for one example of an incomplete pointer substitution configuration requiring a new node and having the destination node of the points-to edge reachable by another node within the same function(s). The graph of FIG. 12 comprises the pointer substitution configuration of FIG. 6 with a substitution edge 605 from an M node 606 to B node 604, with a substitution edge 607 from an N node 608 to M node 606, and with a substitution edge 609 from N node 608 to D node 624. B and N nodes 604 and 608 are within the same function(s) as determined by the markers for B and N nodes 604 and 608. M node 606 is not within the same function(s) as either of B and N nodes 604 and 608. Substitution edges 612 and 609 have the same color or label. The color or label of substitution edge 607 is distinct from the color or label of substitution edges 612 and 609.

Figure 13:
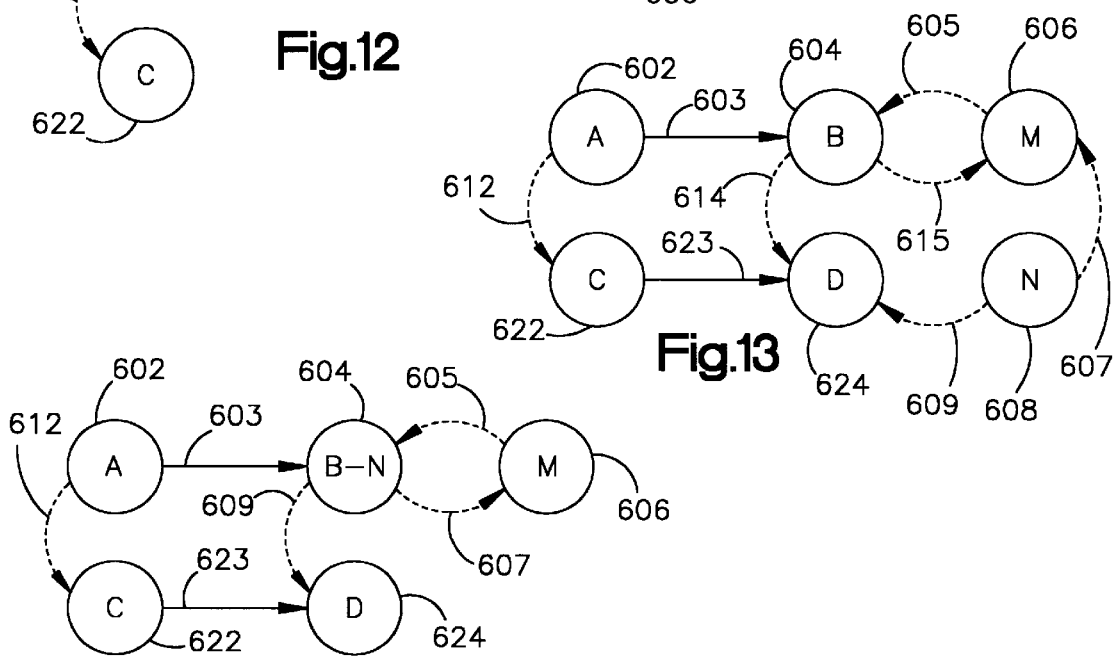
FIG. 13 illustrates a graphical representation for another example of a complete pointer substitution configuration.

Because the analysis determines for step 912 that B node 604 as the destination node of points-to edge 603 is reachable by substitution edges 605 and 607 from N node 608, the analysis for step 916 copies substitution edges 607 and 609 on N node 608 to B node 604 such that B node 604 has an outgoing substitution edge 614 to D node 624 and an outgoing substitution edge 615 to M node 606 as illustrated in FIG. 13. The analysis will later add points-to edge 623 from C node 622 to D node 624 to complete the pointer substitution configuration.

Figure 14:
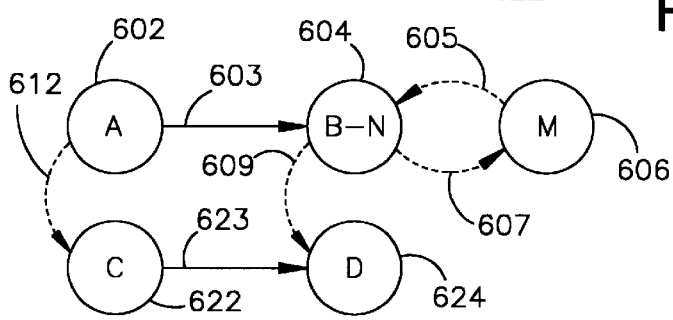
FIG. 14 illustrates a graphical representation for another example of a complete pointer substitution configuration.

The analysis for another embodiment for step 916 unifies the destination node of the points-to edge for the identified pointer substitution configuration with the identified node along the substitution path. For the example of FIG. 12, the analysis unifies B node 604 with N node 608 with resulting B-N node 604 having outgoing substitution edge 609 to D node 624 and outgoing substitution edge 607 to M node 606 as illustrated in FIG. 14. The analysis will later add points-to edge 623 from C node 622 to D node 624 to complete the pointer substitution configuration.

For other embodiments, the analysis for step 916 may copy to the destination node of the points-to edge for the identified pointer substitution configuration all edges on the identified node along the substitution path. If the addition of an edge to the destination node of the points-to edge created a conflict, such as by copying a points-to edge to a node that already has a points-to edge, then the analysis may either not copy the conflicting edge or unify the destination nodes of the two conflicting edges.

After modifying the graph for step 916, the analysis proceeds to step 902 to update node markers in the graph for nodes representing types affected by the modification of the graph for step 916 and further process any incomplete pointer substitution configurations in the graph.

If a new node is not necessary for step 910, the analysis for step 918 determines whether a points-to edge is necessary for completion of the identified pointer substitution configuration. If so, the analysis for step 920 adds the necessary points-to edge. For the examples of FIGS. 13 and 14 following step 916, the analysis determines a points-to edge is necessary from C node 622 to D node 624 to complete the identified pointer substitution configuration and adds points-to edge 623. Although both M node 606 and D node 624 are substitution nodes for B or B-N node 604, the analysis directs points-to edge 623 from C node 622 to the destination node of the substitution edge from the same calling context as substitution edge 612. In this instance, D node 624 is the substitution node from the same calling context as C node 622. The analysis then proceeds to step 902 to update node markers in the graph for nodes representing types affected by the modification of the graph for step 920 and further process any incomplete pointer substitution configurations in the graph.

If a points-to edge is not necessary for step 918, the analysis determines a substitution edge is necessary for completion of the identified pointer substitution configuration and for step 922 adds the necessary substitution edge for the same calling context as the other substitution edge for the identified pointer substitution configuration. The analysis then proceeds to step 902 to update node markers in the graph for nodes representing types affected by the modification of the graph for step 922 and further process any incomplete pointer substitution configurations in the graph.

The analysis repeats steps 902 through 922 as necessary until the analysis has completed all pointer substitution configurations in the graph for the current typing environment as determined for step 904. For embodiments using new markers or tags for the determination for step 912, the analysis for step 924 may then remove any new markers or tags from nodes in the graph.

The analysis for one embodiment may process each incomplete pointer substitution configuration in the graph in any order, and the resulting graph may depend on the order in which each pointer substitution configuration was processed.

Referring to the graph of FIG. 4 for one embodiment of flow diagram 900, the analysis for step 904 identifies, prior to the addition of edges 421 and 425, the incomplete pointer substitution configuration formed by node 302, points-to edge 415, and substitution edge 411. The analysis determines for step 910 that a new node is needed for completion of the pointer substitution configuration and determines for step 912 that destination node 412 of points-edge 415 is reachable by a substitution path along substitution edge 411 from node 302 within the same function(s) represented by node 300. The analysis for this embodiment determines whether the analysis has entered a potential non-terminating loop regardless of whether the destination node of the points-to edge in the identified pointer substitution configuration is new. The analysis modifies the graph for step 916 by copying substitution edge 411 on node 302 as substitution edge 421 to node 412 so the identified pointer substitution configuration may be completed and so the analysis will terminate. The analysis later adds points-to edge 425 for step 920.

Referring to the graph of FIG. 5 for another embodiment of flow diagram 900, the analysis for step 904 identifies, prior to the addition of node 422 and edges 421, 425, 431, and 435, the incomplete pointer substitution configuration formed by node 302, points-to edge 315, and substitution edge 311. The analysis determines for step 910 that a new node is needed for completion of the pointer substitution configuration but determines for step 912 that destination node 312 of points-edge 315, although reachable by a substitution path along substitution edge 311 from node 302 within the same function(s) represented by node 300, was not created during any modification of the graph for flow diagram 900. The analysis for step 914 therefore creates node 422 and adds substitution edge 421 and points-to edge 425 to complete the pointer substitution configuration.

The analysis then identifies for step 904 the incomplete pointer substitution configuration formed by node 312, points-to edge 425, and substitution edge 421. The analysis determines for step 910 that a new node is needed for completion of the pointer substitution configuration and determines for step 912 that destination node 422 of points-edge 425 was created during modification of the graph for flow diagram 900 and is reachable by a substitution path along substitution edge 421 from node 312 within the same function(s) represented by node 300. The analysis modifies the graph for step 916 by copying substitution edge 421 on node 312 as substitution edge 431 to node 422 so the identified pointer substitution configuration may be completed and so the analysis will terminate. The analysis later adds points-to edge 435 for step 920. For another embodiment of flow diagram 900, the analysis proceeds as above yet modifies the graph for step 916 by unifying nodes 312 and 422, resulting in the type graph illustrated in FIG. 4.

Referring to flow diagram 1500 of FIGS. 15A, 15B, and 15C, the analysis for another embodiment may modify the graph for step 812 of FIG. 8 similarly as flow diagram 900 of FIG. 9 in accordance with a prioritized order of processing for each incomplete pointer substitution configuration. The analysis for flow diagram 1500 attempts to process the pointer substitution configurations for one function prior to processing pointer substitution configurations for other functions and uses a first and second stack of memory to help prioritize the order in which each incomplete pointer substitution configuration is processed.

For step 1502 of FIG. 15, the analysis pushes onto either the first or second stack any nodes representing types affected by the modification of types for step 810 of FIG. 8. The analysis for one embodiment pushes onto either stack any nodes that may have been affected for step 810 in such a manner as to form an incomplete pointer substitution configuration in the graph. The analysis may push onto either stack, for example, the source node of each edge added for step 810, the destination node of each call-pattern edge added for step 810, and the source node of each edge to a node unified for step 810. The analysis for other embodiments may push onto either stack all nodes in the graph or all nodes representing location types in the graph.

For step 1504, the analysis updates node markers in the graph for nodes representing types affected by the modification of the graph for step 810 of FIG. 8. The analysis for one embodiment updates node markers in accordance with flow diagram 1000 of FIG. 10.

For step 1506, the analysis determines whether the first stack is storing any nodes to be processed. If so, the analysis for step 1508 pops the next node from the first stack and proceeds to step 1512. Otherwise, the analysis for step 1510 pops the next node from the second stack and proceeds to step 1512. All nodes stored in the first stack are therefore prioritized for processing over all nodes in the second stack. The node popped for step 1508 or 1510 becomes the current node for the analysis.

For step 1512, the analysis determines whether the current node has both an outgoing points-to edge and an outgoing substitution edge for an incomplete pointer substitution configuration. For nodes having more than one outgoing points-to edge and/or more than one outgoing substitution edge, the analysis determines whether the pointer substitution configuration formed by the identified node and each combination of an outgoing substitution edge with an outgoing points-to edge is complete.

If the current node does not have both an outgoing points-to edge and an outgoing substitution edge for an incomplete pointer substitution configuration, the analysis for step 1514 determines whether the first and second stacks have any more nodes to be processed and if so proceeds to step 1506 to process another node. If the first and second stacks do not have any more nodes to be processed, the analysis has determined that the store usages for each function call in the program are well-typed for the current typing environment.

If the current node has both an outgoing points-to edge and an outgoing substitution edge for an incomplete pointer substitution configuration, the analysis for step 1516 determines whether the unification of nodes is necessary for completion of the identified pointer substitution configuration.

If unification is necessary for step 1516, such as for the example of FIG. 11, the analysis unifies the nodes identified as necessary for completion of the identified pointer substitution configuration for step 1518, pushes all the unified nodes onto the second stack for step 1520, pushes the current node onto the first stack for step 1522, and pushes the destination node of the points-to edge from the current node onto the first stack for step 1524. For the example of FIGS. 11 and 7, the analysis pushes the unified D node 624 onto the second stack and pushes the current A node 602 and B node 604 onto the first stack. The analysis pushes the current node onto the first stack for later processing either to complete the identified pointer substitution configuration or to complete other pointer substitution configurations formed, for example, by the current node, the points-to edge from the current node, and another substitution edge from the current node. The analysis then proceeds to step 1504 to update node markers in the graph for nodes representing types affected by the modification of the graph for step 1518 and further process any incomplete pointer substitution configurations in the graph.

If unification is not necessary for step 1516, the analysis for step 1526 determines whether a new node is necessary for completion of the identified pointer substitution configuration. If a new node is necessary for step 1526, the analysis determines for step 1528 whether the analysis will enter a potential non-terminating loop. The analysis may perform step 1528 similarly as for step 912 of FIG. 9.

If the conditions for step 1528 are not satisfied, such as for the example of FIG. 6, the analysis for step 1530 creates a new node and adds the necessary points-to edge and substitution edge to complete the identified pointer substitution configuration. The analysis also pushes the destination node of the substitution edge from the current node onto the second stack for step 1532, pushes the current node onto the first stack for step 1534, and pushes the destination node of the points-to edge from the current node onto the first stack for step 1536. For the example of FIGS. 6 and 7, the analysis pushes C node 622 onto the second stack and pushes the current A node 602 and B node 604 onto the first stack. The analysis then proceeds to step 1504 to update node markers in the graph for nodes representing types affected by the modification of the graph for step 1530 and further process any incomplete pointer substitution configurations in the graph.

If the conditions for step 1528 are satisfied, such as for the example of FIG. 12, the analysis has determined the analysis has entered a potential non-terminating loop and for step 1538 modifies the graph so the identified pointer substitution configuration may be completed while ensuring the analysis will terminate. The analysis may modify the graph for step 1538 similarly as for step 916 of FIG. 9. The analysis also pushes onto the second stack for step 1539 any nodes that may have been affected for step 1538 in such a manner as to form an incomplete pointer substitution configuration in the graph. The analysis for step 1540 pushes the current node onto the first stack. For the example of FIGS. 12 and 13, the analysis pushes B node 604 onto the second stack and pushes A node 602 onto the first stack. For the example of FIGS. 12 and 14, the analysis pushes B-N node 604 onto the second stack and pushes A node 602 onto the first stack. The analysis then proceeds to step 1504 to update node markers in the graph for nodes representing types affected by the modification of the graph for step 1538 and further process any incomplete pointer substitution configurations in the graph.

If a new node is not necessary for step 1526, the analysis for step 1542 determines whether a points-to edge is necessary for completion of the identified pointer substitution configuration. If so, the analysis adds the necessary points-to edge for step 1544, pushes the destination node of the substitution edge from the current node onto the second stack for step 1546, and pushes the current node onto the first stack for step 1548. For the example of FIGS. 13 and 14, the analysis pushes C node 622 onto the second stack and pushes A node 602 onto the first stack. The analysis then proceeds to step 1504 to update node markers in the graph for nodes representing types affected by the modification of the graph for step 1544 and further process any incomplete pointer substitution configurations in the graph.

If a points-to edge is not necessary for step 1542, the analysis determines a substitution edge is necessary for completion of the identified pointer substitution configuration, adds the necessary substitution edge for step 1550, pushes the current node onto the first stack for step 1552, and pushes the destination node of the points-to edge from the current node onto the first stack for step 1553. The analysis then proceeds to step 1504 to update node markers in the graph for nodes representing types affected by the modification of the graph for step 1550 and further process any incomplete pointer substitution configurations in the graph.

The analysis repeats steps 1504 through 1553 as necessary until the analysis determines for step 1514 that the first and second stacks do not have any more nodes to be processed and therefore all pointer substitution configurations in the graph are complete for the current typing environment. For embodiments using new markers or tags for the determination for step 1528, the analysis for step 1554 may then remove any new markers or tags from nodes in the graph.

Data Processing System

Figure 16:
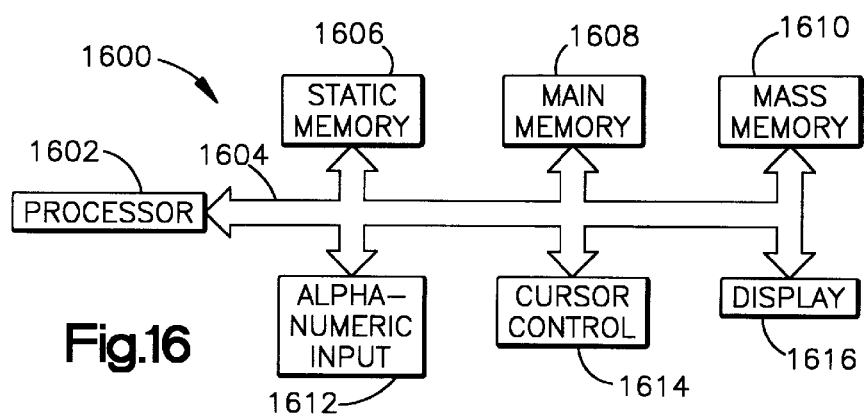
FIG. 16 illustrates for one embodiment a data processing system for performing a terminating polymorphic type inference program analysis.

For one embodiment, terminating polymorphic type inference program analysis may be implemented in software for execution by any suitable data processing system configured with any suitable combination of hardware devices. FIG. 16 illustrates for one embodiment a data processing system 1600 that may be programmed to perform terminating polymorphic type inference program analysis for a program.

As illustrated in FIG. 16, data processing system 1600 comprises a processor 1602, a system bus 1604, a static memory 1606, a main memory 1608, a mass memory 1610, an alphanumeric input device 1612, a cursor control device 1614, and a display 1616. System bus 1604 couples processor 1602, static memory 1606, main memory 1608, mass memory 1610, alphanumeric input device 1612, cursor control device 1614, and display 1616.

Processor 1602 comprises a suitable processing device such as a microprocessor, for example, and may comprise a plurality of suitable processing devices. Processor 1602 may execute instructions stored in static memory 1606, main memory 1608, and/or mass memory 1610 for example. Processor 1602 may process data stored in static memory 1606, main memory 1608, and/or mass memory 1610 for example.

Static memory 1606 may comprise read only memory (ROM) or any other suitable memory device. Static memory 1606 may store, for example, a boot program for execution by processor 1602 to initialize data processing system 1600. Main memory 1608 may comprise random access memory (RAM) or any other suitable memory device. Mass memory 1610 may comprise a hard disk device, a floppy disk, an optical disk, a flash memory device, a file server device, or any other suitable memory device. For this detailed description, the term memory comprises a single memory device and any combination of suitable memory devices for the storage of data and instructions, for example.

System bus 1604 provides for the communication of digital information between hardware devices for data processing system 1600. Processor 1602 may receive over system bus 1604 information that is input by a user through alphanumeric input device 1612 and/or cursor control device 1614. Alphanumeric input device 1612 may comprise a keyboard, for example, that comprises alphanumeric keys. Alphanumeric input device 1612 may comprise other suitable keys, comprising function keys for example. Alphanumeric input device 1612 may be used to input information or commands, for example, for data processing system 1600. Cursor control device 1614 may comprise a mouse, touch tablet, track-ball, and/or joystick, for example, for controlling the movement of a cursor displayed by display 1616.

Processor 1602 may also output over system bus 1604 information that is to be displayed on display 1616. Display 1616 may comprise a cathode ray tube (CRT) or a liquid crystal display (LCD), for example, for displaying information to a user. Processor 1602 may use system bus 1604 to transmit information to and to receive information from other hardware devices such as mass memory 1610 for example.

Data processing system 1600 may be programmed to execute suitable program code or machine instructions directing data processing system 1600 to perform terminating polymorphic type inference analysis for a program. For one embodiment, the executable program code or machine instructions for the analysis may be stored in main memory 1608 and/or in mass memory 1610, such as on a suitable magnetic or optical disk for example, for execution by processor 1602. The program analyzed by data processing system 1600 may also be stored in main memory 1608 and/or in mass memory 1610, such as on a suitable magnetic or optical disk for example.

In the foregoing description, the invention has been described with reference to specific exemplary embodiments thereof. It will, however, be evident that various modifications and changes may be made thereto without departing from the broader spirit or scope of the present invention as defined in the appended claims. The specification and drawings are, accordingly, to be regarded in an illustrative rather than a restrictive sense.

What is claimed is:

1. A method for performing a polymorphic type inference analysis for a program with a data processing system, the program comprising at least one function call, the method comprising the steps of:
   a) representing parameter values for each function call in the program with separate types; and
   b) modifying the types to comply with typing constraints, wherein the modifying step (b) comprises the steps of:
      i) determining whether a potential non-terminating loop has been entered, and
      ii) if a potential non-terminating loop has been entered, modifying the types such that the types comply with the typing constraints and such that the type inference analysis will terminate.

2. The method of claim 1, wherein the representing step (a) comprises the steps of representing a parameter variable for a function in the program with a generic type and representing a value for the parameter variable at a call site of the function with a substitution type for the generic type.

3. The method of claim 2, wherein the modifying step (b) comprises the step of defining a substitution type for a generic type having a generic type component such that the substitution type has a substitution type component for the generic type component.

4. The method of claim 2, wherein the modifying step (b) comprises the step of defining a first substitution type for a first generic type representing a potential pointer to a first location represented by a second generic type to represent a potential pointer to a second location represented by a second substitution type for the second generic type, wherein the first and second substitution types represent values for a same call site of a function.

5. The method of claim 2, wherein the modifying step (b) comprises the step of propagating constraints from generic types to substitution types; and wherein the determining step (b)(i) comprises the step of determining whether the propagation of a constraint from a generic type to a substitution type triggers another propagation of a constraint from a generic type to a substitution type.

6. The method of claim 2, wherein the determining step (b)(i) comprises the steps of identifying a first generic type having a type component and determining whether the type component is a substitution type reachable along a substitution path from a second generic type within a same function.

7. The method of claim 6, wherein the first generic type represents a potential pointer to a location represented by the type component.

8. The method of claim 6, wherein the modifying step (b)(ii) comprises the step of unifying the second generic type with the substitution type reachable along the substitution path from the second generic type.

9. The method of claim 6, wherein the modifying step (b)(ii) comprises the step of defining the substitution type reachable along the substitution path as a generic type for all substitution types for the second generic type.

10. The method of claim 6, wherein the modifying step (b) comprises the step of propagating constraints from generic types to substitution types; and wherein the determining step (b)(i) comprises the step of determining whether the substitution type reachable along the substitution path was created in propagating a constraint to the first generic type as a substitution type for a generic type having the constraint.

11. The method of claim 1, wherein the modifying step (b) comprises the step of prioritizing the modification of types for one function of the program over the modification of types for another function of the program.

12. The method of claim 1, comprising the step of representing globally accessible locations for the program with global types.

13. The method of claim 1, wherein each type is represented by a type variable and an associated type constructor.

14. The method of claim 1, wherein the method performs a pointer analysis using the polymorphic type inference analysis.

15. The method of claim 14, wherein the method performs the pointer analysis while compiling the program for execution by a data processing system.

16. A method for performing a polymorphic type inference pointer analysis for a program with a data processing system, the program comprising at least one function call, the method comprising the steps of:

a) representing locations for the program with separate types, wherein the representing step (a) comprises the step of representing parameter values for each function call in the program with separate types;

b) identifying a store usage for at least one location for the program;

c) determining whether at least one type representing the at least one location for the identified store usage complies with a typing constraint;

d) if the at least one type for the identified store usage does not comply with the typing constraint, modifying the at least one type to comply with the typing constraint; and e) modifying types that represent locations for functions in the program and that are affected by the modifying step (d) to comply with typing constraints, wherein the modifying step (e) comprises the steps of:

i) determining whether a potential non-terminating loop has been entered, and ii) if a potential non-terminating loop has been entered, modifying types such that the types comply with typing constraints and such that the type inference analysis will terminate.

17. The method of claim 16, wherein the representing step (a) comprises the steps of representing a parameter variable for a function in the program with a generic type and representing a value for the parameter variable at a call site of the function with a substitution type for the generic type.

18. The method of claim 17, wherein the modifying step (e) comprises the step of defining a first substitution type for a first generic type representing a potential pointer to a first location represented by a second generic type to represent a potential pointer to a second location represented by a second substitution type for the second generic type, wherein the first and second substitution types represent values for a same call site of a function.

19. The method of claim 17, wherein the modifying step (e) comprises the step of propagating constraints from generic types to substitution types; and wherein the determining step (e)(i) comprises the step of determining whether the propagation of a constraint from a generic type to a substitution type during the modifying step (e) triggers another propagation of a constraint from a generic type to a substitution type during the modifying step (e).

20. The method of claim 17, wherein the determining step (e)(i) comprises the steps of identifying a first generic type representing a potential pointer to a location and determining whether the location is represented by a substitution type reachable along a substitution path from a second generic type within a same function.

21. The method of claim 20, wherein the modifying step (e)(ii) comprises the step of unifying the second generic type with the substitution type reachable along the substitution path from the second generic type.

22. The method of claim 20, wherein the modifying step (e)(ii) comprises the step of defining the substitution type reachable along the substitution path as a generic type for all substitution types for the second generic type.

23. The method of claim 20, wherein the modifying step (e) comprises the step of propagating constraints from generic types to substitution types; and wherein the determining step (e)(i) comprises the step of determining whether the substitution type reachable along the substitution path was created during the modifying step (e) in propagating a points-to constraint to the first generic type as a substitution type for a generic type representing a potential pointer.

24. The method of claim 16, wherein the modifying step (e) comprises the step of prioritizing the modification of types for one function of the program over the modification of types for another function of the program.

25. The method of claim 16, wherein the representing step (a) comprises the step of representing globally accessible locations for the program with global types.

26. The method of claim 16, wherein each type is represented by a type variable and an associated type constructor.

27. The method of claim 26, wherein the method performs the pointer analysis while compiling the program for execution by a data processing system.

28. A memory for storing software for execution by a data processing system to perform a polymorphic type inference analysis for a program comprising at least one function call, the memory comprising:
   a) program code stored by the memory for representing parameter values for each function call in the program with separate types; and
   b) program code stored by the memory for modifying the types to comply with typing constraints, wherein the program code (b) comprises:
      i) program code for determining whether a potential non-terminating loop has been entered, and
      ii) program code for modifying the types such that the types comply with the typing constraints and such that the type inference analysis will terminate if a potential non-terminating loop has been entered.

29. The memory of claim 28, wherein the program code (a) comprises program code for representing a parameter variable for a function in the program with a generic type and for representing a value for the parameter variable at a call site of the function with a substitution type for the generic type.

30. The memory of claim 29, wherein the program code (b) comprises program code for defining a substitution type for a generic type having a generic type component such that the substitution type has a substitution type component for the generic type component.

31. The memory of claim 29, wherein the program code (b) comprises program code for defining a first substitution type for a first generic type representing a potential pointer to a first location represented by a second generic type to represent a potential pointer to a second location represented by a second substitution type for the second generic type, wherein the first and second substitution types represent values for a same call site of a function.

32. The memory of claim 29, wherein the program code (b) comprises program code for propagating constraints from generic types to substitution types; and
   wherein the program code (b)(i) comprises program code for determining whether the propagation of a constraint from a generic type to a substitution type triggers another propagation of a constraint from a generic type to a substitution type.

33. The memory of claim 29, wherein the program code (b)(i) comprises program code for identifying a first generic type having a type component and for determining whether the type component is a substitution type reachable along a substitution path from a second generic type within a same function.

34. The memory of claim 33, wherein the first generic type represents a potential pointer to a location represented by the type component.

35. The memory of claim 33, wherein the program code (b)(ii) comprises program code for unifying the second generic type with the substitution type reachable along the substitution path from the second generic type.

36. The memory of claim 33, wherein the program code (b)(ii) comprises program code for defining the substitution type reachable along the substitution path as a generic type for all substitution types for the second generic type.

37. The memory of claim 33, wherein the program code (b) comprises program code for propagating constraints from generic types to substitution types; and
   wherein the program code (b)(i) comprises program code for determining whether the substitution type reachable along the substitution path was created in propagating a constraint to the first generic type as a substitution type for a generic type having the constraint.

38. The memory of claim 28, wherein the program code (b) comprises program code for prioritizing the modification of types for one function of the program over the modification of types for another function of the program.

39. The memory of claim 28, comprising program code stored by the memory for representing globally accessible locations for the program with global types.

40. The memory of claim 28, comprising program code stored by the memory for representing each type by a type variable and an associated type constructor.

41. The memory of claim 28, comprising program code stored by the memory for performing a pointer analysis using the polymorphic type inference analysis.

42. The memory of claim 41, comprising program code stored by the memory for compiling the program for execution by a data processing system.

43. A data processing system comprising:
   a) a translator for translating a program in a first language into code in a second language, wherein the program comprises at least one function call;
   b) a pointer analyzer for performing a polymorphic type inference pointer analysis for the program, the pointer analyzer for representing parameter values for each function call in the program with separate types, for modifying the types to comply with typing constraints, for determining whether a potential non-terminating loop has been entered, and for modifying the types such that the types comply with the typing constraints and such that the type inference analysis will terminate if a potential non-terminating loop has been entered;
   c) a store model for storing the types for the program; and
   d) an optimizer for optimizing the code based on the store model.

44. The data processing system of claim 43, wherein the pointer analyzer represents a parameter variable for a function in the program with a generic type and represents a value for the parameter variable at a call site of the function with a substitution type for the generic type.

45. The data processing system of claim 44, wherein the pointer analyzer modifies types by defining a first substitution type for a first generic type representing a potential pointer to a first location represented by a second generic type to represent a potential pointer to a second location represented by a second substitution type for the second generic type, wherein the first and second substitution types represent values for a same call site of a function.

46. The data processing system of claim 44, wherein the pointer analyzer modifies types by propagating constraints from generic types to substitution types; and
   wherein the pointer analyzer determines a potential non-terminating loop has been entered by determining whether the propagation of a constraint from a generic type to a substitution type triggers another propagation of a constraint from a generic type to a substitution type.

47. The data processing system of claim 44, wherein the pointer analyzer determines a potential non-terminating loop has been entered by identifying a first generic type representing a potential pointer to a location and determining whether the location is represented by a substitution type reachable along a substitution path from a second generic type within a same function.

48. The data processing system of claim 47, wherein the pointer analyzer modifies types such that the types comply with the typing constraints and such that the type inference analysis will terminate by unifying the second generic type with the substitution type reachable along the substitution path from the second generic type.

49. The data processing system of claim 47, wherein the pointer analyzer modifies types such that the types comply with the typing constraints and such that the type inference analysis will terminate by defining the substitution type reachable along the substitution path as a generic type for all substitution types for the second generic type.

50. The data processing system of claim 47, wherein the pointer analyzer determines a potential non-terminating loop has been entered by determining whether the substitution type reachable along the substitution path was created in propagating a points-to constraint to the first generic type as a substitution type for a generic type representing a potential pointer.

51. The data processing system of claim 43, wherein the pointer analyzer prioritizes the modification of types for one function of the program over the modification of types for another function of the program.

52. The data processing system of claim 43, wherein the pointer analyzer represents globally accessible locations for the program with global types.

53. The data processing system of claim 43, wherein each type is represented by a type variable and an associated type constructor.

* * * * *